US008984644B2

(12) United States Patent
Oliphant et al.

(10) Patent No.: US 8,984,644 B2
(45) Date of Patent: Mar. 17, 2015

(54) ANTI-VULNERABILITY SYSTEM, METHOD, AND COMPUTER PROGRAM PRODUCT

(71) Applicant: SecurityProfiling, LLC, Garland, TX (US)

(72) Inventors: Brett M. Oliphant, Plano, TX (US); John P. Blignaut, West Lafayette, IN (US)

(73) Assignee: SecurityProfiling, LLC, Garland, TX (US)

( * ) Notice: Subject to any disclaimer, the term of this patent is extended or adjusted under 35 U.S.C. 154(b) by 0 days.

(21) Appl. No.: 14/499,237

(22) Filed: Sep. 28, 2014

(65) Prior Publication Data
US 2015/0040232 A1 Feb. 5, 2015

Related U.S. Application Data

(63) Continuation-in-part of application No. 14/138,014, filed on Dec. 21, 2013, which is a continuation of application No. 10/882,852, filed on Jul. 1, 2004, now abandoned.

(60) Provisional application No. 60/484,085, filed on Jul. 1, 2003.

(51) Int. Cl.
G06F 21/50 (2013.01)
H04L 29/06 (2006.01)
G06F 17/30 (2006.01)

(52) U.S. Cl.
CPC ...... H04L 63/1433 (2013.01); G06F 17/30424 (2013.01)
USPC ...................... 726/25; 726/5; 726/22; 726/23

(58) Field of Classification Search
CPC ........................................................ G06F 21/50
USPC ........................................................ 726/5, 25
See application file for complete search history.

(56) References Cited

U.S. PATENT DOCUMENTS 5,008,814 A 4/1991 Mathur
5,210,854 A 5/1993 Beaverton et al.
(Continued)

FOREIGN PATENT DOCUMENTS

EP 1294128 A1 3/2003
JP 2002366525 A 12/2002
(Continued)

OTHER PUBLICATIONS

U.S. Appl. No. 60/448,313, filed Feb. 14, 2003.
(Continued)

Primary Examiner — Haresh N Patel
(74) Attorney, Agent, or Firm — Brian Owens, Esq.

(57) ABSTRACT

A system, method, and computer program product are provided for identifying a first and second occurrence in connection with at least one of the networked device. In use, it is possible that it is determined that the at least one actual vulnerability of the at least one networked device is capable of being taken advantage of by the first occurrence identified in connection with the at least one networked device. Further, it is also possible that it is determined that the at least one actual vulnerability of the at least one networked device is not capable of being taken advantage of by the second occurrence identified in connection with the at least one networked device. To this end, the first occurrence and the second occurrence are reported differently.

20 Claims, 12 Drawing Sheets

Anti-Vulnerability Engine
SDK
Logic Module

Anti-Vulnerability Service
Vulnerabilities Database
Realtime Updater
Core
CD

(56) References Cited

U.S. PATENT DOCUMENTS

| | | |
|---|---|---|
| 5,249,705 A | 10/1993 | Gates |
| 5,253,782 A | 10/1993 | Gates et al. |
| 5,253,932 A | 10/1993 | Nesovic |
| 5,272,754 A | 12/1993 | Boerbert |
| 5,276,735 A | 1/1994 | Boebert et al. |
| 5,335,346 A | 8/1994 | Fabbio |
| 5,361,359 A | 11/1994 | Tajalli et al. |
| 5,499,297 A | 3/1996 | Boebert |
| 5,502,766 A | 3/1996 | Boebert et al. |
| 5,557,346 A | 9/1996 | Lipner et al. |
| 5,557,765 A | 9/1996 | Lipner et al. |
| 5,596,718 A | 1/1997 | Boebert et al. |
| 5,612,503 A | 3/1997 | Sepp |
| 5,640,454 A | 6/1997 | Lipner et al. |
| 5,662,291 A | 9/1997 | Sepp et al. |
| 5,683,638 A | 11/1997 | Crigler et al. |
| 5,696,907 A | 12/1997 | Tom |
| 5,745,573 A | 4/1998 | Lipner et al. |
| 5,765,153 A | 6/1998 | Benantar et al. |
| 5,796,836 A | 8/1998 | Markham |
| 5,819,275 A | 10/1998 | Badger et al. |
| 5,822,435 A | 10/1998 | Boebert et al. |
| 5,831,987 A | 11/1998 | Spilo |
| 5,864,683 A | 1/1999 | Boebert et al. |
| 5,867,647 A | 2/1999 | Haigh et al. |
| 5,892,903 A | 4/1999 | Klaus |
| 5,913,024 A | 6/1999 | Green et al. |
| 5,915,087 A | 6/1999 | Hammond et al. |
| 5,918,018 A | 6/1999 | Gooderum et al. |
| 5,950,195 A | 9/1999 | Stockwell et al. |
| 5,956,403 A | 9/1999 | Lipner et al. |
| 5,968,133 A | 10/1999 | Latham et al. |
| 5,983,350 A | 11/1999 | Minear et al. |
| 5,991,406 A | 11/1999 | Lipner et al. |
| 5,991,856 A | 11/1999 | Spilo et al. |
| 5,991,881 A | 11/1999 | Conklin et al. |
| 6,003,084 A | 12/1999 | Green et al. |
| 6,005,942 A | 12/1999 | Chan et al. |
| 6,006,035 A | 12/1999 | Nabahi |
| 6,028,514 A | 2/2000 | Lemelson et al. |
| 6,029,256 A | 2/2000 | Kouznetsov |
| 6,035,423 A | 3/2000 | Hodges et al. |
| 6,044,466 A | 3/2000 | Anand et al. |
| 6,055,527 A | 4/2000 | Badger et al. |
| 6,064,811 A | 5/2000 | Spilo et al. |
| 6,072,942 A | 6/2000 | Stockwell et al. |
| 6,074,727 A | 6/2000 | Miller et al. |
| 6,084,510 A | 7/2000 | Lemelson et al. |
| 6,122,657 A | 9/2000 | Hoffman, Jr. et al. |
| 6,131,163 A | 10/2000 | Wiegel |
| 6,134,601 A | 10/2000 | Spilo et al. |
| 6,144,934 A | 11/2000 | Stockwell et al. |
| 6,151,643 A | 11/2000 | Cheng et al. |
| 6,173,180 B1 | 1/2001 | Hussain et al. |
| 6,182,226 B1 | 1/2001 | Reid et al. |
| 6,185,689 B1 | 2/2001 | Todd, Sr. et al. |
| 6,195,352 B1 | 2/2001 | Cushman et al. |
| 6,205,552 B1 | 3/2001 | Fudge |
| 6,208,999 B1 | 3/2001 | Spilo et al. |
| 6,209,101 B1 | 3/2001 | Mitchem et al. |
| 6,219,707 B1 | 4/2001 | Gooderum et al. |
| 6,219,786 B1 | 4/2001 | Cunningham et al. |
| 6,226,372 B1 | 5/2001 | Beebe et al. |
| 6,230,199 B1 | 5/2001 | Revashetti et al. |
| 6,230,288 B1 | 5/2001 | Kuo et al. |
| 6,240,531 B1 | 5/2001 | Spilo et al. |
| 6,249,585 B1 | 6/2001 | McGrew et al. |
| 6,266,774 B1 | 7/2001 | Sampath et al. |
| 6,266,811 B1 | 7/2001 | Nabahi |
| 6,267,039 B1 | 7/2001 | Czarnecki |
| 6,269,456 B1 | 7/2001 | Hodges et al. |
| 6,272,632 B1 | 8/2001 | Carman et al. |
| 6,275,942 B1 | 8/2001 | Bernhard et al. |
| 6,282,546 B1 | 8/2001 | Gleichauf et al. |
| 6,298,422 B1 | 10/2001 | Spilo et al. |
| 6,298,445 B1 | 10/2001 | Shostack et al. |
| 6,301,658 B1 | 10/2001 | Koehler |
| 6,301,668 B1 | 10/2001 | Gleichauf et al. |
| 6,301,699 B1 | 10/2001 | Hollander et al. |
| 6,314,190 B1 | 11/2001 | Zimmermann |
| 6,321,293 B1 | 11/2001 | Fabrizio et al. |
| 6,321,334 B1 | 11/2001 | Jerger et al. |
| 6,321,336 B1 | 11/2001 | Applegate et al. |
| 6,324,656 B1 | 11/2001 | Gleichauf et al. |
| 6,332,195 B1 | 12/2001 | Green et al. |
| 6,336,186 B1 | 1/2002 | Dyksterhouse et al. |
| 6,343,362 B1 | 1/2002 | Ptacek et al. |
| 6,345,361 B1 | 2/2002 | Jerger et al. |
| 6,351,794 B1 | 2/2002 | Spilo et al. |
| 6,353,446 B1 | 3/2002 | Vaughn et al. |
| 6,357,010 B1 | 3/2002 | Viets et al. |
| 6,370,578 B2 | 4/2002 | Revashetti et al. |
| 6,385,458 B1 | 5/2002 | Papadimitriou et al. |
| 6,393,424 B1 | 5/2002 | Hallman et al. |
| 6,402,689 B1 | 6/2002 | Scarantino et al. |
| 6,415,321 B1 | 7/2002 | Gleichauf et al. |
| 6,418,554 B1 | 7/2002 | Delo et al. |
| 6,442,686 B1 | 8/2002 | McArdle et al. |
| 6,453,347 B1 | 9/2002 | Revashetti et al. |
| 6,453,419 B1 | 9/2002 | Flint et al. |
| 6,457,076 B1 | 9/2002 | Cheng et al. |
| 6,460,126 B1 | 10/2002 | Spilo et al. |
| 6,470,384 B1 | 10/2002 | O'Brien et al. |
| 6,473,800 B1 | 10/2002 | Jerger et al. |
| 6,477,550 B1 | 11/2002 | Balasubramaniam et al. |
| 6,477,651 B1 | 11/2002 | Teal |
| 6,493,756 B1 | 12/2002 | O'Brien et al. |
| 6,496,875 B2 | 12/2002 | Cheng et al |
| 6,499,107 B1 | 12/2002 | Gleichauf et al. |
| 6,499,109 B1 | 12/2002 | Balasubramaniam et al. |
| 6,510,448 B1 | 1/2003 | Churchyard |
| 6,513,122 B1 | 1/2003 | Magdych et al. |
| 6,523,023 B1 | 2/2003 | Sonnenberg |
| 6,526,513 B1 | 2/2003 | Shrader et al. |
| 6,535,227 B1 | 3/2003 | Fox et al. |
| 6,542,943 B2 | 4/2003 | Cheng et al. |
| 6,546,493 B1 | 4/2003 | Magdych et al. |
| 6,550,012 B1 | 4/2003 | Villa et al. |
| 6,553,377 B1 | 4/2003 | Eschelbeck et al. |
| 6,553,378 B1 | 4/2003 | Eschelbeck |
| 6,567,808 B1 | 5/2003 | Eschelbeck et al. |
| 6,584,504 B1 | 6/2003 | Choe |
| 6,584,508 B1 | 6/2003 | Epstein et al. |
| 6,587,888 B1 | 7/2003 | Chieu et al. |
| 6,601,091 B1 | 7/2003 | Spilo |
| 6,604,139 B1 | 8/2003 | Sajina et al. |
| 6,608,817 B1 | 8/2003 | Ivory |
| 6,611,869 B1 | 8/2003 | Eschelbeck et al. |
| 6,611,925 B1 | 8/2003 | Spear |
| 6,615,266 B1 | 9/2003 | Hoffman, Jr. et al. |
| 6,622,150 B1 | 9/2003 | Kouznetsov et al. |
| 6,633,835 B1 | 10/2003 | Moran et al. |
| 6,636,972 B1 | 10/2003 | Ptacek et al. |
| 6,640,307 B2 | 10/2003 | Viets et al. |
| 6,654,751 B1 | 11/2003 | Schmugar et al. |
| 6,654,782 B1 | 11/2003 | O'Brien et al. |
| 6,658,571 B1 | 12/2003 | O'Brien et al. |
| 6,663,000 B1 | 12/2003 | Muttik et al. |
| 6,665,269 B1 | 12/2003 | Schmitz |
| 6,668,054 B1 | 12/2003 | Contino et al. |
| 6,668,289 B2 | 12/2003 | Cheng et al. |
| 6,671,368 B1 | 12/2003 | Contino et al. |
| 6,671,812 B1 | 12/2003 | Balasubramaniam et al. |
| 6,674,738 B1 | 1/2004 | Yildiz et al. |
| 6,675,042 B2 | 1/2004 | Swerdlow et al. |
| 6,678,887 B1 | 1/2004 | Hallman et al. |
| 6,684,329 B1 | 1/2004 | Epstein et al. |
| 6,687,833 B1 | 2/2004 | Osborne et al. |
| 6,693,888 B2 | 2/2004 | Cafarelli et al. |
| 6,697,337 B1 | 2/2004 | Cafarelli et al. |
| 6,697,870 B1 | 2/2004 | Cafarelli, III et al. |
| 6,697,950 B1 | 2/2004 | Ko |
| 6,701,440 B1 | 3/2004 | Kim et al. |
| 6,701,441 B1 | 3/2004 | Balasubramaniam et al. |

(56) References Cited

U.S. PATENT DOCUMENTS

| | | |
|---|---|---|
| 6,704,874 B1 | 3/2004 | Porras et al. |
| 6,707,794 B1 | 3/2004 | Leong et al. |
| 6,708,292 B1 | 3/2004 | Mangasarian |
| 6,711,127 B1 | 3/2004 | Gorman et al. |
| 6,714,513 B1 | 3/2004 | Joiner et al. |
| 6,718,469 B2 | 4/2004 | Pak et al. |
| 6,721,847 B2 | 4/2004 | Hursey |
| 6,725,377 B1 | 4/2004 | Kouznetsov |
| 6,728,219 B1 | 4/2004 | Leong et al. |
| 6,728,885 B1 | 4/2004 | Taylor et al. |
| 6,732,157 B1 | 5/2004 | Gordon et al. |
| 6,735,629 B1 | 5/2004 | Cafarelli, III et al. |
| 6,735,703 B1 | 5/2004 | Kilpatrick et al. |
| 6,742,124 B1 | 5/2004 | Kilpatrick et al. |
| 6,742,128 B1 | 5/2004 | Joiner |
| 6,745,192 B1 | 6/2004 | Libenzi |
| 6,745,311 B2 | 6/2004 | Fabrizio et al. |
| 6,748,534 B1 | 6/2004 | Gryaznov et al. |
| 6,751,627 B2 | 6/2004 | Sternin |
| 6,751,718 B1 | 6/2004 | Manin |
| 6,754,488 B1 | 6/2004 | Won et al. |
| 6,754,705 B2 | 6/2004 | Joiner et al. |
| 6,754,896 B2 | 6/2004 | Mishra et al. |
| 6,757,727 B1 | 6/2004 | Ivory |
| 6,757,822 B1 | 6/2004 | Feiertag et al. |
| 6,757,830 B1 | 6/2004 | Tarbotton et al. |
| 6,760,845 B1 | 7/2004 | Cafarelli et al. |
| 6,763,403 B2 | 7/2004 | Cheng et al. |
| 6,763,466 B1 | 7/2004 | Glover |
| 6,766,458 B1 | 7/2004 | Harris et al. |
| 6,768,721 B1 | 7/2004 | Schmitz et al. |
| 6,768,991 B2 | 7/2004 | Hearnden |
| 6,769,016 B2 | 7/2004 | Rothwell et al. |
| 6,772,332 B1 | 8/2004 | Boebert et al. |
| 6,772,334 B1 | 8/2004 | Glawitsch |
| 6,772,345 B1 | 8/2004 | Shetty |
| 6,775,704 B1 | 8/2004 | Watson et al. |
| 6,775,780 B1 | 8/2004 | Muttik |
| 6,779,033 B1 | 8/2004 | Watson et al. |
| 6,782,421 B1 | 8/2004 | Soles et al. |
| 6,782,527 B1 | 8/2004 | Kouznetsov et al. |
| 6,785,237 B1 | 8/2004 | Sufleta |
| 6,785,820 B1 | 8/2004 | Muttik et al. |
| 6,785,821 B1 | 8/2004 | Teal |
| 6,789,082 B2 | 9/2004 | Sternin et al. |
| 6,789,117 B1 | 9/2004 | Joiner et al. |
| 6,789,201 B2 | 9/2004 | Barton et al. |
| 6,789,202 B1 | 9/2004 | Ko et al. |
| 6,792,543 B2 | 9/2004 | Pak et al. |
| 6,799,197 B1 | 9/2004 | Shetty et al. |
| 6,801,756 B1 | 10/2004 | Agrawal et al. |
| 6,801,940 B1 | 10/2004 | Moran et al. |
| 6,802,012 B1 | 10/2004 | Smithson et al. |
| 6,810,017 B1 | 10/2004 | Leong et al. |
| 6,814,842 B1 | 11/2004 | Yago et al. |
| 6,816,896 B2 | 11/2004 | Fortin et al. |
| 6,816,973 B1 | 11/2004 | Gleichauf et al. |
| 6,823,460 B1 | 11/2004 | Hollander et al. |
| 6,826,608 B1 | 11/2004 | Sheth et al. |
| 6,826,698 B1 | 11/2004 | Minkin et al. |
| 6,834,301 B1 | 12/2004 | Hanchett |
| 6,836,860 B2 | 12/2004 | Muttik et al. |
| 6,839,852 B1 | 1/2005 | Pantuso et al. |
| 6,842,860 B1 | 1/2005 | Branstad et al. |
| 6,842,861 B1 | 1/2005 | Cox et al. |
| 6,843,190 B1 | 1/2005 | LaPierre-McAfee |
| 6,845,449 B1 | 1/2005 | Carman et al. |
| 6,851,058 B1 | 2/2005 | Gartside |
| 6,851,061 B1 | 2/2005 | Holland, III et al. |
| 6,859,793 B1 | 2/2005 | Lambiase |
| 6,862,581 B1 | 3/2005 | Lambiase |
| 6,868,069 B2 | 3/2005 | Knobbe et al. |
| 6,868,413 B1 | 3/2005 | Grindrod et al. |
| 6,871,279 B2 | 3/2005 | Sames et al. |
| 6,874,018 B2 | 3/2005 | Wu |
| 6,879,812 B2 | 4/2005 | Agrawal et al. |
| 6,886,099 B1 | 4/2005 | Smithson et al. |
| 6,892,227 B1 | 5/2005 | Elwell et al. |
| 6,892,241 B2 | 5/2005 | Kouznetsov et al. |
| 6,895,387 B1 | 5/2005 | Roberts et al. |
| 6,895,513 B1 | 5/2005 | Balasubramaniam et al. |
| 6,898,712 B2 | 5/2005 | Vignoles et al. |
| 6,898,715 B1 | 5/2005 | Smithson et al. |
| 6,904,521 B1 | 6/2005 | Jivsov |
| 6,907,396 B1 | 6/2005 | Muttik et al. |
| 6,915,426 B1 | 7/2005 | Carman et al. |
| 6,920,493 B1 | 7/2005 | Schwab |
| 6,920,558 B2 | 7/2005 | Sames et al. |
| 6,922,776 B2 | 7/2005 | Cook et al. |
| 6,928,555 B1 | 8/2005 | Drew |
| 6,931,540 B1 | 8/2005 | Edwards et al. |
| 6,931,546 B1 | 8/2005 | Kouznetsov et al. |
| 6,934,857 B1 | 8/2005 | Bartleson et al. |
| 6,938,161 B2 | 8/2005 | Vignoles et al. |
| 6,941,358 B1 | 9/2005 | Joiner et al. |
| 6,944,775 B2 | 9/2005 | Barton et al. |
| 6,947,986 B1 | 9/2005 | Huang et al. |
| 6,950,933 B1 | 9/2005 | Cook et al. |
| 6,950,947 B1 | 9/2005 | Purtell et al. |
| 6,952,779 B1 | 10/2005 | Cohen et al. |
| 6,957,348 B1 | 10/2005 | Flowers et al. |
| 6,959,418 B1 | 10/2005 | Churchyard |
| 6,961,783 B1 | 11/2005 | Cook et al. |
| 6,963,978 B1 | 11/2005 | Muttik et al. |
| 6,964,014 B1 | 11/2005 | Parish |
| 6,965,928 B1 | 11/2005 | Cox et al. |
| 6,966,059 B1 | 11/2005 | Shetty et al. |
| 6,968,461 B1 | 11/2005 | Lucas et al. |
| 6,970,697 B2 | 11/2005 | Kouznetsov et al. |
| 6,970,823 B1 | 11/2005 | Yago et al. |
| 6,971,023 B1 | 11/2005 | Makinson et al. |
| 6,973,577 B1 | 12/2005 | Kouznetsov |
| 6,973,578 B1 | 12/2005 | McIchionc |
| 6,976,068 B2 | 12/2005 | Kadam et al. |
| 6,976,168 B1 | 12/2005 | Branstad et al. |
| 6,978,454 B2 | 12/2005 | Singleton |
| 6,980,992 B1 | 12/2005 | Hursey et al. |
| 6,981,280 B2 | 12/2005 | Grupe |
| 6,983,325 B1 | 1/2006 | Watson et al. |
| 6,983,326 B1 | 1/2006 | Vigue et al. |
| 6,983,380 B2 | 1/2006 | Ko |
| 6,983,486 B1 | 1/2006 | Hanchett |
| 6,986,160 B1 | 1/2006 | LeGrow |
| 6,987,963 B2 | 1/2006 | Kouznetsov et al. |
| 6,988,209 B1 | 1/2006 | Balasubramaniam et al. |
| 6,990,591 B1 | 1/2006 | Pearson |
| 6,993,660 B1 | 1/2006 | Libenzi et al. |
| 7,000,247 B2 | 2/2006 | Banzhof |
| 7,000,250 B1 | 2/2006 | Kuo et al. |
| 7,003,561 B1 | 2/2006 | Magdych et al. |
| 7,007,302 B1 | 2/2006 | Jagger et al. |
| 7,010,696 B1 | 3/2006 | Cambridge et al. |
| 7,013,330 B1 | 3/2006 | Tarbotton et al. |
| 7,016,939 B1 | 3/2006 | Rothwell et al. |
| 7,016,948 B1 | 3/2006 | Yildiz |
| 7,023,861 B2 | 4/2006 | Makinson et al. |
| 7,024,432 B2 | 4/2006 | Muttik et al. |
| 7,024,694 B1 | 4/2006 | Ko |
| 7,035,544 B1 | 4/2006 | Won |
| 7,036,147 B1 | 4/2006 | Hursey |
| 7,039,702 B1 | 5/2006 | Churchyard |
| 7,039,721 B1 | 5/2006 | Wu et al. |
| 7,043,024 B1 | 5/2006 | Dinsmore et al. |
| 7,043,634 B2 | 5/2006 | Wolff et al. |
| 7,043,756 B2 | 5/2006 | Tsafnat et al. |
| 7,043,758 B2 | 5/2006 | Grupe |
| 7,047,297 B2 | 5/2006 | Huntington et al. |
| 7,051,077 B2 | 5/2006 | Lin |
| 7,051,097 B1 | 5/2006 | Pecina |
| 7,051,365 B1 | 5/2006 | Bellovin |
| 7,055,036 B2 | 5/2006 | Kouznetsov et al. |
| 7,058,975 B2 | 6/2006 | Edwards et al. |
| 7,062,555 B1 | 6/2006 | Kouznetsov et al. |
| 7,062,783 B1 | 6/2006 | Joiner |

(56) References Cited

U.S. PATENT DOCUMENTS

| | | | |
|---|---|---|---|
| 7,065,790 B1 | 6/2006 | Gryaznov |
| 7,069,316 B1 | 6/2006 | Gryaznov |
| 7,069,330 B1 | 6/2006 | McArdle et al. |
| 7,069,581 B2 | 6/2006 | Fu et al. |
| 7,069,594 B1 | 6/2006 | Bolin |
| 7,073,198 B1 | 7/2006 | Flowers et al. |
| 7,076,650 B1 | 7/2006 | Sonnenberg |
| 7,076,801 B2 | 7/2006 | Gong et al. |
| 7,080,000 B1 | 7/2006 | Cambridge |
| 7,080,141 B1 | 7/2006 | Baekelmans et al. |
| 7,080,408 B1 | 7/2006 | Pak et al. |
| 7,085,931 B1 | 8/2006 | Smith et al. |
| 7,085,934 B1 | 8/2006 | Edwards |
| 7,086,050 B2 | 8/2006 | Barton et al. |
| 7,089,259 B1 | 8/2006 | Kouznetsov et al. |
| 7,089,302 B1 | 8/2006 | Churchyard et al. |
| 7,093,002 B2 | 8/2006 | Wolff et al. |
| 7,093,121 B2 | 8/2006 | Barton et al. |
| 7,093,292 B1 | 8/2006 | Pantuso |
| 7,093,293 B1 | 8/2006 | Smithson et al. |
| 7,096,368 B2 | 8/2006 | Kouznetsov et al. |
| 7,096,500 B2 | 8/2006 | Roberts et al. |
| 7,096,501 B2 | 8/2006 | Kouznetsov et al. |
| 7,096,503 B1 | 8/2006 | Magdych et al. |
| 7,107,366 B2 | 9/2006 | Cheng et al. |
| 7,107,574 B1 | 9/2006 | Nedbal |
| 7,107,617 B2 | 9/2006 | Hursey et al. |
| 7,107,618 B1 | 9/2006 | Gordon et al. |
| 7,114,183 B1 | 9/2006 | Joiner |
| 7,114,185 B2 | 9/2006 | Moore et al. |
| 7,117,533 B1 | 10/2006 | Libenzi |
| 7,120,252 B1 | 10/2006 | Jones et al. |
| 7,124,181 B1 | 10/2006 | Magdych et al. |
| 7,134,140 B2 | 11/2006 | Fisher |
| 7,136,487 B1 | 11/2006 | Schon et al. |
| 7,140,042 B2 | 11/2006 | Verma |
| 7,146,155 B2 | 12/2006 | Kouznetsov |
| 7,146,642 B1 | 12/2006 | Magdych et al. |
| 7,149,189 B2 | 12/2006 | Huntington et al. |
| 7,150,042 B2 | 12/2006 | Wolff et al. |
| 7,152,105 B2 | 12/2006 | McClure et al. |
| 7,152,241 B2 | 12/2006 | Grupe |
| 7,154,857 B1 | 12/2006 | Joiner et al. |
| 7,159,036 B2 | 1/2007 | Hinchliffe et al. |
| 7,159,237 B2 | 1/2007 | Schneier et al. |
| 7,162,698 B2 | 1/2007 | Huntington et al. |
| 7,171,681 B1 | 1/2007 | Duncan et al. |
| 7,171,690 B2 | 1/2007 | Kouznetsov et al. |
| 7,178,144 B2 | 2/2007 | Melchione et al. |
| 7,181,015 B2 | 2/2007 | Matt |
| 7,181,506 B1 | 2/2007 | Vigue et al. |
| 7,181,613 B2 | 2/2007 | Boebert et al. |
| 7,181,769 B1 | 2/2007 | Keanini et al. |
| 7,185,361 B2 | 2/2007 | Ashoff et al. |
| 7,188,367 B1 | 3/2007 | Edwards et al. |
| 7,203,963 B1 | 4/2007 | Wu et al. |
| 7,209,954 B1 | 4/2007 | Rothwell et al. |
| 7,210,041 B1 | 4/2007 | Gryaznov et al. |
| 7,210,168 B2 | 4/2007 | Hursey et al. |
| 7,213,153 B2 | 5/2007 | Hollander et al. |
| 7,213,260 B2 | 5/2007 | Judge |
| 7,216,343 B2 | 5/2007 | Das et al. |
| 7,225,466 B2 | 5/2007 | Judge |
| 7,228,565 B2 | 6/2007 | Wolff et al. |
| 7,228,566 B2 | 6/2007 | Caceres et al. |
| 7,231,440 B1 | 6/2007 | Kouznetsov et al. |
| 7,231,637 B1 | 6/2007 | McEwan |
| 7,231,664 B2 | 6/2007 | Markham et al. |
| 7,231,665 B1 | 6/2007 | McArdle et al. |
| 7,234,165 B1 | 6/2007 | Hursey et al. |
| 7,234,167 B2 | 6/2007 | Teblyashkin et al. |
| 7,234,168 B2 | 6/2007 | Gupta et al. |
| 7,237,008 B1 | 6/2007 | Tarbotton et al. |
| 7,237,122 B2 | 6/2007 | Kadam et al. |
| 7,237,222 B1 | 6/2007 | Nedbal et al. |
| 7,237,258 B1 | 6/2007 | Pantuso et al. |
| 7,240,102 B1 | 7/2007 | Kouznetsov et al. |
| 7,240,193 B2 | 7/2007 | Hatfalvi et al. |
| 7,243,148 B2 | 7/2007 | Keir et al. |
| 7,243,373 B2 | 7/2007 | Muttik et al. |
| 7,249,187 B2 | 7/2007 | Sobel et al. |
| 7,251,685 B1 | 7/2007 | Yildiz |
| 7,251,830 B1 | 7/2007 | Melchione |
| 7,254,811 B2 | 8/2007 | Kouznetsov et al. |
| 7,257,630 B2 | 8/2007 | Cole et al. |
| 7,257,773 B1 | 8/2007 | Jagger et al. |
| 7,257,842 B2 | 8/2007 | Barton et al. |
| 7,263,561 B1 | 8/2007 | Green et al. |
| 7,263,718 B2 | 8/2007 | O'Brien et al. |
| 7,266,843 B2 | 9/2007 | Tarbotton et al. |
| 7,266,844 B2 | 9/2007 | Teblyashkin et al. |
| 7,269,649 B1 | 9/2007 | Brown et al. |
| 7,269,851 B2 | 9/2007 | Ackroyd |
| 7,272,724 B2 | 9/2007 | Tarbotton et al. |
| 7,277,957 B2 | 10/2007 | Rowley et al. |
| 7,278,163 B2 | 10/2007 | Banzhof et al. |
| 7,281,267 B2 | 10/2007 | Tarbotton et al. |
| 7,281,268 B2 | 10/2007 | Hollander et al. |
| 7,284,267 B1 | 10/2007 | McArdle et al. |
| 7,296,080 B2 | 11/2007 | Rowley et al. |
| 7,299,361 B1 | 11/2007 | Kim et al. |
| 7,302,584 B2 | 11/2007 | Tarbotton et al. |
| 7,302,706 B1 | 11/2007 | Hicks et al. |
| 7,305,005 B1 | 12/2007 | Wu et al. |
| 7,305,709 B1 | 12/2007 | Lymer et al. |
| 7,308,702 B1 | 12/2007 | Thomsen et al. |
| 7,308,706 B2 | 12/2007 | Markham et al. |
| 7,308,712 B2 | 12/2007 | Banzhof |
| 7,308,715 B2 | 12/2007 | Gupta et al. |
| 7,310,817 B2 | 12/2007 | Hinchliffe et al. |
| 7,310,818 B1 | 12/2007 | Parish et al. |
| 7,315,801 B1 | 1/2008 | Dowd et al. |
| 7,315,894 B2 | 1/2008 | Huntington et al. |
| 7,325,252 B2 | 1/2008 | Bunker, V et al. |
| 7,328,234 B1 | 2/2008 | Nedbal et al. |
| 7,334,222 B2 | 2/2008 | Keller |
| 7,340,774 B2 | 3/2008 | Hursey et al. |
| 7,340,775 B1 | 3/2008 | Tarbotton et al. |
| 7,343,626 B1 | 3/2008 | Gallagher |
| 7,346,781 B2 | 3/2008 | Cowie et al. |
| 7,346,929 B1 | 3/2008 | Hammond |
| 7,350,203 B2 | 3/2008 | Jahn |
| 7,350,234 B2 | 3/2008 | Goseva-Popstojanova et al. |
| 7,353,539 B2 | 4/2008 | Brawn et al. |
| 7,359,962 B2 | 4/2008 | Willebeek-LeMair et al. |
| 7,367,054 B2* | 4/2008 | Soppera .................. 726/13 |
| 7,373,659 B1 | 5/2008 | Vignoles et al. |
| 7,376,842 B1 | 5/2008 | Hursey |
| 7,380,270 B2 | 5/2008 | Tracy et al. |
| 7,383,556 B1 | 6/2008 | Pantuso et al. |
| 7,383,581 B1 | 6/2008 | Moore et al. |
| 7,389,539 B1 | 6/2008 | Kouznetsov |
| 7,391,770 B1 | 6/2008 | Taylor et al. |
| 7,392,043 B2 | 6/2008 | Kouznetsov et al. |
| 7,398,516 B2 | 7/2008 | Berg et al. |
| 7,398,517 B2 | 7/2008 | Berg et al. |
| 7,401,359 B2 | 7/2008 | Gartside et al. |
| 7,409,593 B2 | 8/2008 | Aaron |
| 7,409,714 B2 | 8/2008 | Gupta et al. |
| 7,409,720 B1 | 8/2008 | Cambridge et al. |
| 7,412,721 B2 | 8/2008 | Torii et al. |
| 7,412,722 B1 | 8/2008 | Norris et al. |
| 7,412,723 B2 | 8/2008 | Blake et al. |
| 7,415,726 B2 | 8/2008 | Kelly et al. |
| 7,418,730 B2 | 8/2008 | Chu et al. |
| 7,418,733 B2 | 8/2008 | Connary et al. |
| 7,418,734 B2 | 8/2008 | Berg et al. |
| 7,418,737 B2 | 8/2008 | Grupe |
| 7,421,266 B1 | 9/2008 | Bruestle et al. |
| 7,421,587 B2 | 9/2008 | Cowie et al. |
| 7,424,706 B2 | 9/2008 | Ivanov et al. |
| 7,424,744 B1 | 9/2008 | Wu et al. |
| 7,424,746 B1 | 9/2008 | Magdych et al. |
| 7,426,551 B1 | 9/2008 | Benzinger et al. |

(56) References Cited

U.S. PATENT DOCUMENTS

| | | |
|---|---|---|
| 7,440,403 B2 | 10/2008 | Rosenfled |
| 7,440,471 B1 | 10/2008 | Hinchliffe et al. |
| 7,441,274 B2 | 10/2008 | Drew |
| 7,451,488 B2 | 11/2008 | Cooper et al. |
| 7,458,098 B2 | 11/2008 | Judge et al. |
| 7,461,403 B1 | 12/2008 | Libenzi et al. |
| 7,464,408 B1 | 12/2008 | Shah et al. |
| 7,472,419 B1 | 12/2008 | Balasubramaniam et al. |
| 7,472,421 B2 | 12/2008 | Cummins |
| 7,480,941 B1 | 1/2009 | Balasubramaniam et al. |
| 7,483,861 B1 | 1/2009 | Joiner et al. |
| 7,493,659 B1 | 2/2009 | Wu et al. |
| 7,496,043 B1 | 2/2009 | Leong et al. |
| 7,509,676 B2 | 3/2009 | Trueba |
| 7,509,681 B2 | 3/2009 | Flowers et al. |
| 7,516,483 B2 | 4/2009 | Brennan |
| 7,519,954 B1 | 4/2009 | Beddoe et al. |
| 7,519,994 B2 | 4/2009 | Judge et al. |
| 7,522,531 B2 | 4/2009 | Joiner et al. |
| 7,533,272 B1 | 5/2009 | Gordon et al. |
| 7,536,456 B2 | 5/2009 | Williams et al. |
| 7,536,715 B2 | 5/2009 | Markham |
| 7,540,031 B2 | 5/2009 | Kouznetsov et al. |
| 7,543,056 B2 | 6/2009 | McClure et al. |
| 7,543,070 B1 | 6/2009 | Watson et al. |
| 7,543,329 B2 | 6/2009 | Viets et al. |
| 7,543,334 B2 | 6/2009 | Vignoles et al. |
| 7,549,168 B1 | 6/2009 | Magdych et al. |
| 7,552,480 B1 | 6/2009 | Voss |
| 7,555,776 B1 | 6/2009 | Lymer et al. |
| 7,562,388 B2 | 7/2009 | Hackenberger et al. |
| 7,574,740 B1 | 8/2009 | Kennis |
| 7,587,759 B1 | 9/2009 | McArdle et al. |
| 7,590,247 B1 | 9/2009 | Dinsmore et al. |
| 7,590,725 B1 | 9/2009 | Harrison |
| 7,590,844 B1 | 9/2009 | Sherman et al. |
| 7,590,855 B2 | 9/2009 | Irwin |
| 7,590,859 B2 | 9/2009 | Brennan |
| 7,594,262 B2 | 9/2009 | Hanzlik et al. |
| 7,594,273 B2 | 9/2009 | Keanini et al. |
| 7,603,711 B2 | 10/2009 | Scheidell |
| 7,613,625 B2 | 11/2009 | Heinrich |
| 7,620,816 B1 | 11/2009 | Vigue et al. |
| 7,624,422 B2 | 11/2009 | Williams et al. |
| 7,624,444 B2 | 11/2009 | Gupta et al. |
| 7,624,450 B1 | 11/2009 | Lymer et al. |
| 7,627,891 B2 | 12/2009 | Williams et al. |
| 7,634,800 B2 | 12/2009 | Ide et al. |
| 7,640,335 B1 | 12/2009 | Agrawal et al. |
| 7,640,361 B1 | 12/2009 | Green et al. |
| 7,640,586 B1 | 12/2009 | Johnson et al. |
| 7,644,352 B2 | 1/2010 | Grupe |
| 7,647,376 B1 | 1/2010 | Jagger et al. |
| 7,664,845 B2 | 2/2010 | Kurtz et al. |
| 7,665,137 B1 | 2/2010 | Barton et al. |
| 7,668,947 B2 | 2/2010 | Hutchinson et al. |
| 7,669,237 B2 | 2/2010 | Shahbazi |
| 7,673,043 B2 | 3/2010 | Keir et al. |
| 7,673,146 B2 | 3/2010 | Wiedmann et al. |
| 7,673,150 B2 | 3/2010 | Cox et al. |
| 7,673,242 B1 | 3/2010 | Huntington et al. |
| 7,673,342 B2 | 3/2010 | Hursey et al. |
| 7,673,343 B1 | 3/2010 | Barton et al. |
| 7,674,298 B2 | 3/2010 | Cambridge |
| 7,681,208 B1 | 3/2010 | Pantuso et al. |
| 7,693,742 B1 | 4/2010 | Joiner et al. |
| 7,693,947 B2 | 4/2010 | Judge et al. |
| 7,694,128 B2 | 4/2010 | Judge et al. |
| 7,694,339 B2 | 4/2010 | Blake et al. |
| 7,698,275 B2 | 4/2010 | O'Brien et al. |
| 7,711,662 B2 | 5/2010 | Buscema |
| 7,712,138 B2 | 5/2010 | Zobel et al. |
| 7,716,719 B2 | 5/2010 | Kouznetsov et al. |
| 7,716,742 B1 | 5/2010 | Roesch et al. |
| 7,721,110 B2 | 5/2010 | Kouznetsov et al. |
| 7,739,722 B2 | 6/2010 | Okajo et al. |
| 7,757,293 B2 | 7/2010 | Caceres et al. |
| 7,757,361 B2 | 7/2010 | Edwards et al. |
| 7,761,605 B1 | 7/2010 | Rothwell et al. |
| 7,761,920 B2 | 7/2010 | Bezilla et al. |
| 7,770,225 B2 | 8/2010 | Hammond |
| 7,779,466 B2 | 8/2010 | Judge et al. |
| 7,779,468 B1 | 8/2010 | Magdych et al. |
| 7,783,545 B2 | 8/2010 | Sloan et al. |
| 7,788,705 B2 | 8/2010 | Bruestle et al. |
| 7,788,718 B1 | 8/2010 | Fei et al. |
| 7,793,346 B1 | 9/2010 | Daub |
| 7,793,348 B2 | 9/2010 | Lingafelt et al. |
| 7,801,980 B1 | 9/2010 | Roesch et al. |
| 7,810,091 B2 | 10/2010 | Gartside et al. |
| 7,818,739 B2 | 10/2010 | Cox et al. |
| 7,822,666 B1 | 10/2010 | Bursch |
| 7,823,204 B2 | 10/2010 | Gupta et al. |
| 7,827,607 B2 | 11/2010 | Sobel et al. |
| 7,827,611 B2 | 11/2010 | Kouznetsov et al. |
| 7,836,501 B2 | 11/2010 | Sobel et al. |
| 7,840,663 B1 | 11/2010 | Hinchliffe et al. |
| 7,841,007 B2 | 11/2010 | Currie et al. |
| 7,845,007 B1 | 11/2010 | Kennis |
| 7,861,285 B2 | 12/2010 | Ashoff et al. |
| 7,861,303 B2 | 12/2010 | Kouznetsov et al. |
| 7,865,938 B2 | 1/2011 | Shahbazi |
| 7,865,956 B1 | 1/2011 | Cambridge et al. |
| 7,870,203 B2 | 1/2011 | Judge et al. |
| 7,882,555 B2 | 2/2011 | Ben-Itzhak |
| 7,895,641 B2 | 2/2011 | Schneier et al. |
| 7,900,254 B1 | 3/2011 | Fisher et al. |
| 7,903,549 B2 | 3/2011 | Judge et al. |
| 7,904,955 B1 | 3/2011 | Bu et al. |
| 7,913,303 B1 | 3/2011 | Rouland et al. |
| 7,917,444 B1 | 3/2011 | Bursch |
| 7,917,647 B2 | 3/2011 | Cooper et al. |
| 7,917,951 B1 | 3/2011 | Tarbotton et al. |
| 7,921,459 B2 | 4/2011 | Houston et al. |
| 7,926,113 B1 | 4/2011 | Gula et al. |
| 7,941,855 B2 | 5/2011 | Sung et al. |
| 7,954,159 B2 | 5/2011 | Hrabik et al. |
| 7,958,554 B2 | 6/2011 | Chow et al. |
| 7,975,296 B2 | 7/2011 | Apfelbaum et al. |
| 7,984,511 B2 | 7/2011 | Kocher et al. |
| 7,991,827 B1 | 8/2011 | Whitmore et al. |
| 7,991,917 B1 | 8/2011 | Wu et al. |
| 7,996,201 B2 | 8/2011 | Dowd et al. |
| 7,996,902 B1 | 8/2011 | Gordon et al. |
| 8,010,387 B2 | 8/2011 | Porter et al. |
| 8,019,082 B1 | 9/2011 | Wiedmann et al. |
| 8,020,211 B2 | 9/2011 | Keanini et al. |
| 8,024,076 B2 | 9/2011 | Schlueter et al. |
| 8,042,149 B2 | 10/2011 | Judge |
| 8,042,178 B1 | 10/2011 | Fisher et al. |
| 8,042,181 B2 | 10/2011 | Judge |
| 8,051,479 B1 | 11/2011 | Bu et al. |
| 8,068,441 B1 | 11/2011 | Wiedmann et al. |
| 8,069,480 B1 | 11/2011 | Tarbotton et al. |
| 8,069,481 B2 | 11/2011 | Judge |
| 8,074,256 B2 | 12/2011 | Valente et al. |
| 8,074,282 B1 | 12/2011 | Lymer et al. |
| 8,090,816 B1 | 1/2012 | Deshmukh et al. |
| 8,091,117 B2 | 1/2012 | Williams et al. |
| 8,099,760 B2 | 1/2012 | Cohen et al. |
| 8,115,769 B1 | 2/2012 | Lymer et al. |
| 8,117,273 B1 | 2/2012 | Mathur et al. |
| 8,121,874 B1 | 2/2012 | Guheen et al. |
| 8,121,892 B2 | 2/2012 | Baggett, Jr. et al. |
| 8,122,498 B1 | 2/2012 | Gordon et al. |
| 8,122,499 B2 | 2/2012 | Hall |
| 8,127,359 B2 | 2/2012 | Kelekar |
| 8,132,250 B2 | 3/2012 | Judge et al. |
| 8,135,823 B2 | 3/2012 | Cole et al. |
| 8,135,830 B2 | 3/2012 | McClure et al. |
| 8,140,642 B1 | 3/2012 | Kadam et al. |
| 8,141,157 B2 | 3/2012 | Farley et al. |
| 8,156,483 B2 | 4/2012 | Berg et al. |
| 8,171,551 B2 | 5/2012 | Muttik et al. |

(56) References Cited

U.S. PATENT DOCUMENTS

| | | | |
|---|---|---|---|
| 8,176,544 B2 | 5/2012 | Keanini et al. | |
| 8,176,553 B1 | 5/2012 | Magdych et al. | |
| 8,181,173 B2 | 5/2012 | Childress et al. | |
| 8,181,222 B2 | 5/2012 | Thomsen et al. | |
| 8,185,930 B2 | 5/2012 | Alperovitch et al. | |
| 8,185,943 B1 | 5/2012 | Jagger et al. | |
| 8,219,620 B2 | 7/2012 | Hart | |
| 8,230,497 B2 | 7/2012 | Norman et al. | |
| 8,230,502 B1 | 7/2012 | Lymer et al. | |
| 8,239,941 B1 | 8/2012 | Lymer et al. | |
| 8,250,654 B1 * | 8/2012 | Kennedy et al. | 726/22 |
| 8,256,002 B2 | 8/2012 | Chandrashekhar et al. | |
| 8,260,906 B1 | 9/2012 | Freedman | |
| 8,266,320 B1 * | 9/2012 | Bell et al. | 709/238 |
| 8,266,703 B1 | 9/2012 | Magdych et al. | |
| 8,291,505 B2 | 10/2012 | Hursey | |
| 8,310,955 B1 | 11/2012 | Wiedmann et al. | |
| 8,312,535 B1 | 11/2012 | Gordon et al. | |
| 8,341,693 B2 | 12/2012 | Shahbazi | |
| 8,359,650 B2 | 1/2013 | Lotem et al. | |
| 8,364,772 B1 | 1/2013 | Mathur et al. | |
| 8,380,791 B1 | 2/2013 | Gordon et al. | |
| 8,387,146 B2 | 2/2013 | Parish et al. | |
| 8,393,001 B1 | 3/2013 | Libenzi et al. | |
| 8,402,540 B2 | 3/2013 | Kapoor et al. | |
| 8,407,683 B2 | 3/2013 | Cheng et al. | |
| 8,407,798 B1 | 3/2013 | Lotem et al. | |
| 8,468,256 B1 | 6/2013 | McArdle et al. | |
| 8,490,197 B2 | 7/2013 | Herz | |
| 8,495,740 B1 | 7/2013 | Rouland et al. | |
| 8,510,839 B2 | 8/2013 | Tarbotton et al. | |
| 8,527,977 B1 | 9/2013 | Cheng et al. | |
| 8,533,703 B2 | 9/2013 | Cheng et al. | |
| 8,539,063 B1 | 9/2013 | Sharma et al. | |
| 8,549,611 B2 | 10/2013 | Judge et al. | |
| 8,549,635 B2 | 10/2013 | Muttik et al. | |
| 8,555,344 B1 | 10/2013 | Wiedmann et al. | |
| 8,555,374 B2 | 10/2013 | Wu et al. | |
| 8,561,167 B2 | 10/2013 | Alperovitch et al. | |
| 8,561,175 B2 | 10/2013 | Williams et al. | |
| 8,578,480 B2 | 11/2013 | Judge et al. | |
| 8,615,582 B2 | 12/2013 | McClure et al. | |
| 8,621,060 B2 | 12/2013 | McClure et al. | |
| 8,621,073 B2 | 12/2013 | McClure et al. | |
| 8,621,077 B2 | 12/2013 | Hinchliffe et al. | |
| 8,627,443 B2 | 1/2014 | Jagger et al. | |
| 8,627,466 B2 | 1/2014 | Fisher et al. | |
| 8,631,124 B2 | 1/2014 | Whitmore et al. | |
| 8,631,495 B2 | 1/2014 | Judge | |
| 8,634,309 B2 | 1/2014 | O'Brien | |
| 8,656,502 B2 | 2/2014 | Gartside et al. | |
| 8,661,126 B2 | 2/2014 | Cole et al. | |
| 8,700,767 B2 | 4/2014 | Cole et al. | |
| 8,706,576 B1 | 4/2014 | Balasubramaniam et al. | |
| 8,732,835 B2 | 5/2014 | Gordon et al. | |
| 8,744,938 B1 | 6/2014 | Bursch | |
| 8,776,230 B1 | 7/2014 | Singleton | |
| 8,782,260 B2 | 7/2014 | Taylor et al. | |
| 8,789,193 B2 | 7/2014 | Kelekar | |
| 2001/0014150 A1 | 8/2001 | Beebe et al. | |
| 2001/0027388 A1 | 10/2001 | Beverina et al. | |
| 2001/0027389 A1 | 10/2001 | Beverina et al. | |
| 2001/0028268 A1 | 10/2001 | Shuler, Jr. | |
| 2001/0028269 A1 | 10/2001 | Shuler, Jr. | |
| 2001/0034847 A1 | 10/2001 | Gaul, Jr. | |
| 2001/0042004 A1 | 11/2001 | Taub | |
| 2001/0043778 A1 | 11/2001 | Griffis et al. | |
| 2002/0013811 A1 | 1/2002 | Kim | |
| 2002/0026591 A1 | 2/2002 | Hartley et al. | |
| 2002/0032860 A1 | 3/2002 | Wheeler et al. | |
| 2002/0042687 A1 | 4/2002 | Tracy et al. | |
| 2002/0042877 A1 | 4/2002 | Wheeler et al. | |
| 2002/0069035 A1 | 6/2002 | Tracy et al. | |
| 2002/0078381 A1 | 6/2002 | Farley et al. | |
| 2002/0092924 A1 | 7/2002 | Ingham, Jr. et al. | |
| 2002/0104014 A1 | 8/2002 | Zobel et al. | |
| 2002/0109963 A1 | 8/2002 | Aoki et al. | |
| 2002/0112179 A1 | 8/2002 | Riordan et al. | |
| 2002/0116631 A1 | 8/2002 | Torii et al. | |
| 2002/0120558 A1 | 8/2002 | Reid | |
| 2002/0137991 A1 | 9/2002 | Scarantino et al. | |
| 2002/0138416 A1 * | 9/2002 | Lovejoy et al. | 705/38 |
| 2002/0147803 A1 | 10/2002 | Dodd et al. | |
| 2002/0150866 A1 | 10/2002 | Perry et al. | |
| 2002/0178383 A1 | 11/2002 | Hrabik et al. | |
| 2002/0199122 A1 | 12/2002 | Davis et al. | |
| 2003/0005178 A1 | 1/2003 | Hemsath | |
| 2003/0014669 A1 | 1/2003 | Caceres et al. | |
| 2003/0023873 A1 | 1/2003 | Ben-Itzhak | |
| 2003/0028803 A1 | 2/2003 | Bunker, V et al. | |
| 2003/0033542 A1 | 2/2003 | Goseva-Popstojanova et al. | |
| 2003/0037258 A1 | 2/2003 | Koren | |
| 2003/0037601 A1 | 2/2003 | Mansky et al. | |
| 2003/0046128 A1 | 3/2003 | Heinrich | |
| 2003/0050718 A1 | 3/2003 | Tracy et al. | |
| 2003/0051163 A1 | 3/2003 | Bidaud | |
| 2003/0056116 A1 | 3/2003 | Bunker, V et al. | |
| 2003/0061506 A1 | 3/2003 | Cooper et al. | |
| 2003/0065945 A1 | 4/2003 | Lingafelt et al. | |
| 2003/0070003 A1 | 4/2003 | Chong et al. | |
| 2003/0083831 A1 | 5/2003 | Agrawal et al. | |
| 2003/0084320 A1 | 5/2003 | Tarquini et al. | |
| 2003/0091951 A1 | 5/2003 | Guilmette et al. | |
| 2003/0097228 A1 | 5/2003 | Satya et al. | |
| 2003/0126472 A1 | 7/2003 | Banzhof | |
| 2003/0135749 A1 | 7/2003 | Gales et al. | |
| 2003/0140249 A1 | 7/2003 | Taninaka et al. | |
| 2003/0140250 A1 | 7/2003 | Taninaka et al. | |
| 2003/0145228 A1 | 7/2003 | Suuronen et al. | |
| 2003/0154269 A1 | 8/2003 | Nyanchama et al. | |
| 2003/0159060 A1 | 8/2003 | Gales et al. | |
| 2003/0159063 A1 | 8/2003 | Apfelbaum et al. | |
| 2003/0188194 A1 | 10/2003 | Currie et al. | |
| 2003/0195569 A1 | 10/2003 | Swerdlow et al. | |
| 2003/0195861 A1 | 10/2003 | McClure et al. | |
| 2003/0202663 A1 | 10/2003 | Hollis et al. | |
| 2003/0204632 A1 | 10/2003 | Willebeek-LeMair et al. | |
| 2003/0204719 A1 | 10/2003 | Ben-Itzhak | |
| 2003/0204728 A1 | 10/2003 | Irwin | |
| 2003/0212779 A1 | 11/2003 | Boyter et al. | |
| 2003/0212909 A1 | 11/2003 | Chandrashekhar et al. | |
| 2003/0217039 A1 | 11/2003 | Kurtz et al. | |
| 2003/0233438 A1 | 12/2003 | Hutchinson et al. | |
| 2004/0006704 A1 | 1/2004 | Dahlstrom et al. | |
| 2004/0015338 A1 | 1/2004 | Lawrence et al. | |
| 2004/0015728 A1 | 1/2004 | Cole et al. | |
| 2004/0015737 A1 | 1/2004 | Martin et al. | |
| 2004/0019803 A1 | 1/2004 | Jahn | |
| 2004/0021889 A1 | 2/2004 | McAfee et al. | |
| 2004/0022359 A1 | 2/2004 | Acharya et al. | |
| 2004/0024781 A1 | 2/2004 | Youd | |
| 2004/0030778 A1 | 2/2004 | Kronenberg et al. | |
| 2004/0044912 A1 | 3/2004 | Connary et al. | |
| 2004/0049372 A1 | 3/2004 | Keller | |
| 2004/0054764 A1 | 3/2004 | Aderton et al. | |
| 2004/0064722 A1 | 4/2004 | Neelay et al. | |
| 2004/0064726 A1 | 4/2004 | Girouard | |
| 2004/0071081 A1 | 4/2004 | Rosenfled | |
| 2004/0073800 A1 | 4/2004 | Shah et al. | |
| 2004/0078384 A1 | 4/2004 | Keir et al. | |
| 2004/0088564 A1 | 5/2004 | Norman | |
| 2004/0088565 A1 | 5/2004 | Norman et al. | |
| 2004/0088581 A1 | 5/2004 | Brawn et al. | |
| 2004/0098623 A1 | 5/2004 | Scheidell | |
| 2004/0102922 A1 | 5/2004 | Tracy et al. | |
| 2004/0102923 A1 | 5/2004 | Tracy et al. | |
| 2004/0103310 A1 | 5/2004 | Sobel et al. | |
| 2004/0103431 A1 | 5/2004 | Davenport et al. | |
| 2004/0106955 A1 | 6/2004 | Swerdlow et al. | |
| 2004/0117624 A1 | 6/2004 | Brandt et al. | |
| 2004/0117640 A1 | 6/2004 | Chu et al. | |
| 2004/0128529 A1 | 7/2004 | Blake et al. | |
| 2004/0128530 A1 | 7/2004 | Isenberg | |
| 2004/0128543 A1 | 7/2004 | Blake et al. | |

(56) References Cited

U.S. PATENT DOCUMENTS

| | | |
|---|---|---|
| 2004/0148520 A1* | 7/2004 | Talpade et al. ............... 713/201 |
| 2004/0153171 A1 | 8/2004 | Brandt et al. |
| 2004/0158545 A1 | 8/2004 | Turgeon |
| 2004/0172550 A1 | 9/2004 | Sai |
| 2004/0181787 A1 | 9/2004 | Wickham et al. |
| 2004/0192204 A1 | 9/2004 | Periyalwar et al. |
| 2004/0193918 A1 | 9/2004 | Green et al. |
| 2004/0210653 A1 | 10/2004 | Kanoor et al. |
| 2004/0215972 A1 | 10/2004 | Sung et al. |
| 2004/0215978 A1 | 10/2004 | Okajo et al. |
| 2004/0221176 A1 | 11/2004 | Cole |
| 2004/0243603 A1 | 12/2004 | Komatsu |
| 2004/0250115 A1 | 12/2004 | Gemmel et al. |
| 2004/0250128 A1 | 12/2004 | Bush et al. |
| 2004/0259640 A1 | 12/2004 | Gentles et al. |
| 2004/0268322 A1 | 12/2004 | Chow et al. |
| 2005/0005169 A1 | 1/2005 | Kelekar |
| 2005/0007743 A1 | 1/2005 | Eckblad et al. |
| 2005/0010819 A1 | 1/2005 | Williams et al. |
| 2005/0010821 A1 | 1/2005 | Cooper et al. |
| 2005/0015382 A1 | 1/2005 | Aaron |
| 2005/0015667 A1 | 1/2005 | Aaron |
| 2005/0022028 A1 | 1/2005 | Hall |
| 2005/0033988 A1 | 2/2005 | Chandrashekhar et al. |
| 2005/0049962 A1 | 3/2005 | Porter et al. |
| 2005/0091542 A1 | 4/2005 | Banzhof |
| 2005/0114186 A1 | 5/2005 | Heinrich |
| 2005/0160286 A1 | 7/2005 | Currie et al. |
| 2005/0177752 A1 | 8/2005 | Hollander et al. |
| 2005/0193430 A1* | 9/2005 | Cohen et al. ............... 726/25 |
| 2005/0195975 A1 | 9/2005 | Kawakita |
| 2005/0216957 A1* | 9/2005 | Banzhof et al. ............... 726/25 |
| 2005/0222969 A1 | 10/2005 | Yip et al. |
| 2005/0235360 A1 | 10/2005 | Pearson |
| 2005/0240756 A1 | 10/2005 | Mayer |
| 2006/0004614 A1 | 1/2006 | Hutchinson et al. |
| 2006/0030972 A1 | 2/2006 | Schlueter et al. |
| 2006/0031938 A1 | 2/2006 | Choi |
| 2006/0041936 A1* | 2/2006 | Anderson et al. ............... 726/11 |
| 2006/0069912 A1 | 3/2006 | Zheng et al. |
| 2006/0070129 A1 | 3/2006 | Sobel et al. |
| 2006/0101517 A1* | 5/2006 | Banzhof et al. ............... 726/25 |
| 2006/0130139 A1 | 6/2006 | Sobel et al. |
| 2006/0156407 A1 | 7/2006 | Cummins |
| 2006/0168660 A1 | 7/2006 | Edwards et al. |
| 2006/0179325 A1 | 8/2006 | Debiez |
| 2006/0230006 A1 | 10/2006 | Buscema |
| 2006/0265708 A1 | 11/2006 | Blanding et al. |
| 2006/0265746 A1 | 11/2006 | Farley et al. |
| 2006/0272011 A1 | 11/2006 | Ide et al. |
| 2006/0293942 A1 | 12/2006 | Chaddha et al. |
| 2007/0016659 A1 | 1/2007 | Peck et al. |
| 2008/0005555 A1 | 1/2008 | Lotem et al. |
| 2008/0047016 A1* | 2/2008 | Spoonamore ............... 726/25 |
| 2008/0052054 A1 | 2/2008 | Beverina et al. |
| 2008/0060075 A1 | 3/2008 | Cox et al. |
| 2008/0127349 A1* | 5/2008 | Ormazabal et al. ............... 726/25 |
| 2008/0216173 A1 | 9/2008 | Hammond |
| 2008/0222724 A1* | 9/2008 | Ormazabal et al. ............... 726/23 |
| 2008/0222731 A1* | 9/2008 | Dowd et al. |
| 2008/0263525 A1 | 10/2008 | Berg et al. |
| 2008/0263668 A1 | 10/2008 | Chu et al. |
| 2008/0271151 A1 | 10/2008 | Blake et al. |
| 2009/0077666 A1* | 3/2009 | Chen et al. ............... 726/25 |
| 2009/0320138 A1 | 12/2009 | Keanini et al. |
| 2009/0328213 A1 | 12/2009 | Blake et al. |
| 2010/0083382 A1 | 4/2010 | Farley et al. |
| 2010/0100961 A1 | 4/2010 | Scheidell |
| 2010/0218256 A1* | 8/2010 | Thomas et al. ............... 726/25 |
| 2010/0241478 A1* | 9/2010 | Sahinoglu ............... 705/8 |
| 2011/0131644 A1 | 6/2011 | Keanini et al. |
| 2011/0138036 A1* | 6/2011 | Tyree ............... 709/224 |
| 2011/0162049 A1 | 6/2011 | Shahbazi |
| 2011/0173342 A1 | 7/2011 | Cooper et al. |
| 2011/0173677 A1 | 7/2011 | Tarbotton et al. |
| 2011/0214179 A1 | 9/2011 | Chow et al. |
| 2011/0214185 A1 | 9/2011 | Parish et al. |
| 2011/0258315 A1 | 10/2011 | Whitmore et al. |
| 2011/0258694 A1 | 10/2011 | Wu et al. |
| 2012/0017278 A1 | 1/2012 | Fisher et al. |
| 2012/0030766 A1 | 2/2012 | Tarbotton et al. |
| 2012/0084867 A1 | 4/2012 | Baggett, Jr. et al. |
| 2012/0102570 A1 | 4/2012 | Herz |
| 2012/0110671 A1* | 5/2012 | Beresnevichiene et al. ..... 726/25 |
| 2012/0144476 A1 | 6/2012 | McClure et al. |
| 2012/0144493 A1 | 6/2012 | Cole et al. |
| 2012/0144494 A1 | 6/2012 | Cole et al. |
| 2012/0151594 A1 | 6/2012 | McClure et al. |
| 2012/0151595 A1 | 6/2012 | McClure et al. |
| 2012/0151596 A1 | 6/2012 | McClure et al. |
| 2012/0173931 A1* | 7/2012 | Kube et al. ............... 714/37 |
| 2012/0185549 A1 | 7/2012 | Hart |
| 2012/0185550 A1 | 7/2012 | Hart |
| 2012/0185551 A1 | 7/2012 | Hart |
| 2012/0192262 A1 | 7/2012 | Jagger et al. |
| 2012/0192279 A1 | 7/2012 | Muttik et al. |
| 2012/0204265 A1 | 8/2012 | Judge |
| 2012/0210434 A1* | 8/2012 | Curtis et al. ............... 726/25 |
| 2012/0271890 A1 | 10/2012 | Judge et al. |
| 2012/0317627 A1 | 12/2012 | Chandrashekhar et al. |
| 2013/0031265 A1 | 1/2013 | Freedman |
| 2013/0031635 A1 | 1/2013 | Lotem et al. |
| 2013/0055394 A1* | 2/2013 | Beresnevichiene et al. ..... 726/24 |
| 2013/0167240 A1 | 6/2013 | Kelekar |
| 2013/0246620 A1 | 9/2013 | Rothwell et al. |
| 2013/0275999 A1 | 10/2013 | Gordon et al. |
| 2013/0312101 A1 | 11/2013 | Lotem et al. |
| 2014/0215605 A1* | 7/2014 | Decime et al. ............... 726/22 |

FOREIGN PATENT DOCUMENTS

| | | |
|---|---|---|
| WO | WO0214987 A2 | 2/2002 |
| WO | WO03007192 A1 | 1/2003 |
| WO | WO03029940 A2 | 4/2003 |
| WO | WO03029941 A2 | 4/2003 |
| WO | WO2004086168 | 10/2004 |
| WO | WO2004114663 | 12/2004 |

OTHER PUBLICATIONS

"Symantec unveils vulnerability assessment tool," May 13, 2003, retrieved from https://web.archive.org/web/20140818164413/http://www.computerweekly.com/news/2240050753/Symantec-unveils-vulnerability-assessment-tool.

Symantec Corporation, Symantec Introduces New Vulnerability Assessment Solution: Symantec Vulnerability Assessment Provides Vulnerability Identification and Prioritization to Proactively Secure Systems at Risk, News Release, May 12, 2003, retrieved from http://www.symantec.com/press/2003/n030512a.html.

"Introduction to Symantec Vulnerability Assessment 1.0," Jan. 1, 2003, retrieved from http://www.symantec.com/business/support/index?page=content&id=TECH111970.

Gula, Ron, "Correlating IDS Alerts with Vulnerability Information," Dec. 2002 (Updated Jan. 2009), pp. 1-10, retrieved from http://docs.huihoo.com/nessus/va-ids.pdf.

Desai, Neil, "IDS Correlation of VA Data and IDS Alerts," Jun. 29, 2003, retrieved from http://www.symantec.com/connect/articles/ids-correlation-va-data-and-ids-alerts.

"Qualys Introduces First Network Vulnerability Assessment Platform for Managed Security and Consulting Organizations," Apr. 10, 2001, retrieved from http://www.qualys.com/company/newsroom/news-releases/usa/2001-04-10-3/.

"Qualys Introduces New Intranet Scanner Appliance," Sep. 30, 2002, retrieved from http://www.qualys.com/company/newsroom/news-releases/usa/2002-09-30/.

Qualys "Case Study: Bank of the West—Major Financial Institution Protects Information Assets Through Regular Network Vulnerability Audits," Jul. 2005, retrieved from http://www.qualys.com/docs/bank_of_west.pdf.

Gula, Ron, "Example Lightning Deployment Scenarios," Dec. 2002, 5 pages, retrieved from https://web.archive.org/web/20030316012821/http://www.tenablesecurity.com/example.pdf.

(56) References Cited

OTHER PUBLICATIONS

Gula, Ron, "Offering Managed Security Services with Lightning," Dec. 2002, 6 pages, retrieved from https://web.archive.org/web/20030316085246/http://www.tenablesecurity.com/manage.pdf.
Tenable Network Security Inc., "Lightning Console," 2002, retrieved from https://web.archive.org/web/20030416093233/http://www.tenablesecurity.com/console.html.
Tenable Network Security Inc., "Screen Shots," 2002, retrieved from https://web.archive.org/web/20030214013753/http://www.tenablesecurity.com/screenshots.html.
SecurityProfiling, "News," Jul. 2001, retrieved from https://web.archive.org/web/20021209114707/http://securityprofiling.com/news.htm.
Symantec Corporation, "Norton Ghost™ User's Guide," 2002, 221 pages.
Symantec Corporation, "Symantec™ Vulnerability Assessment Implementation Guide," Version 1.0, 2003, 108 pages.
Huber, Robert, "Strategies for Improving Vulnerability Assessment Effectiveness in Large Organizations," SANS Institute InfoSec Reading Room, Version 1.4b (amended Aug. 29, 2002), GSEC Option 1, Apr. 20, 2003, 18 pages.
U.S. Appl. No. 60/441,422, filed Jan. 21, 2003.
U.S. Appl. No. 60/388,078, filed Jun. 11, 2002.
U.S. Appl. No. 60/345,689, filed Dec. 31, 2001.
U.S. Appl. No. 60/484,085, filed Jul. 1, 2003.
U.S. Appl. No. 10/882,588, filed Jul. 1, 2004.
Office Action Summary in U.S. Appl. No. 10/882,588 dated May 29, 2009.
Office Action Summary in U.S. Appl. No. 10/882,588 dated Oct. 12, 2010.
Office Action Summary in U.S. Appl. No. 10/882,588 dated Jun. 12, 2012.
Office Action Summary in U.S. Appl. No. 10/882,588 dated Jan. 8, 2010.
Office Action Summary in U.S. Appl. No. 10/882,588 dated Apr. 15, 2011.
Office Action Summary in U.S. Appl. No. 10/882,588 dated Jun. 24, 2010.
Office Action Summary in U.S. Appl. No. 10/882,588 dated Sep. 26, 2007.
Office Action Summary in U.S. Appl. No. 10/882,588 dated Oct. 20, 2011.
U.S. Appl. No. 10/882,788, filed Jul. 1, 2004.
Office Action Summary in U.S. Appl. No. 10/882,788 dated Dec. 22, 2008.
Office Action Summary in U.S. Appl. No. 10/882,788 dated Jul. 10, 2008.
Office Action Summary in U.S. Appl. No. 10/882,788 dated Oct. 4, 2007.
U.S. Appl. No. 10/882,852, filed Jul. 1, 2004.
Office Action Summary in U.S. Appl. No. 10/882,852 dated May 15, 2013.
Office Action Summary in U.S. Appl. No. 10/882,852 dated Jun. 1, 2010.
Office Action Summary in U.S. Appl. No. 10/882,852 dated Aug. 14, 2008.
Office Action Summary in U.S. Appl. No. 10/882,852 dated Jun. 24, 2009.
Office Action Summary in U.S. Appl. No. 10/882,852 dated Nov. 1, 2007.
U.S. Appl. No. 10/882,853, filed Jul. 1, 2004.
Office Action Summary in U.S. Appl. No. 10/882,853 dated Mar. 18, 2009.
Office Action Summary in U.S. Appl. No. 10/882,853 dated Apr. 30, 2008.
Office Action Summary in U.S. Appl. No. 10/882,853 dated Oct. 17, 2008.
Office Action Summary in U.S. Appl. No. 10/882,853 dated Oct. 31, 2007.
U.S. Appl. No. 10/883,376, filed Jul. 1, 2004.
Office Action Summary in U.S. Appl. No. 10/883,376 dated Sep. 11, 2008.
Office Action Summary in U.S. Appl. No. 10/883,376 dated May 6, 2008.
U.S. Appl. No. 10/884,329, filed Jul. 1, 2004.
Office Action Summary in U.S. Appl. No. 10/884,329 dated Nov. 29, 2007.
U.S. Appl. No. 14/138,014, filed Dec. 31, 2013.
Office Action Summary in U.S. Appl. No. 14/138,014 dated Aug. 28, 2014.
U.S. Appl. No. 14/499,226, filed Sep. 28, 2014.
U.S. Appl. No. 14/499,227, filed Sep. 28, 2014.
Office Action Summary in U.S. Appl. No. 14/499,227 dated Dec. 15, 2014.
U.S. Appl. No. 14/499,230, filed Sep. 28, 2014.
U.S. Appl. No. 14/499,234, filed Sep. 28, 2014.
U.S. Appl. No. 14/499,235, filed Sep. 28, 2014.
Office Action Summary in U.S. Appl. No. 14/499,235 dated Dec. 15, 2014.
U.S. Appl. No. 14/499,236, filed Sep. 28, 2014.
Office Action Summary in U.S. Appl. No. 14/499,236 dated Dec. 30, 2014.
U.S. Appl. No. 14/499,237, filed Sep. 28, 2014.
U.S. Appl. No. 14/499,239, filed Sep. 29, 2014.
U.S. Appl. No. 14/499,241, filed Sep. 29, 2014.
Office Action Summary in U.S. Appl. No. 14/499,241 dated Dec. 15, 2014.
U.S. Appl. No. 14/499,244, filed Sep. 29, 2014.
U.S. Appl. No. 14/499,246, filed Sep. 29, 2014.
U.S. Appl. No. 14/499,250, filed Sep. 29, 2014.
CERT Incident Note IN-2000-07, "Exploitation of Hidden File Extensions", Jul. 27, 2000, at CERT.org, pp. 1-3.
Julia Allen et al., "State of the Practice of Intrusion Detection Technologies," Jan. 2000, Networked Systems Survivability Program, cover page-p. 220 and report documentation page.
"Review SPQUERY", in Network Computing, Nov. 2000, www.networkcomputerco.uk/back_iss/prod_update/reviews/spquery4.1.htm.
Business Wire, "Ready for Windows 2000 Service Pack 1? St. Bernard Software's SPQuery 4.0 is Here Just Time," Aug. 2, 2000, pp. 1-2, www.findarticles.com/p/articles/mi_m0EIN/is_August_2/ai_63819686/print.
Mark Joseph Edwards, "Useful SPQuery 3.0 automates finding, installing hotfixes," in InfoWorld, Jun. 21, 1999, www.infoworld.com/cgi-bin/displayArchive.pl?/99/25/c04-25.46.htm.
WebConsole Core 4.0 for NetWare, archived May 11, 2000, pp. 1-3 http://web.archive.org/web/20000511133746/www.patchlink.com/products/wcnwa_product . . . .
PatchLink, Gravitix The Patch Finder, archived Aug. 15, 2000, http://web.archive.org/web/20000815094824//www.patchlink.com/products/gravitix.asp.
Steve Manzuik, "Ultimate Security Toolkit", InstantDoc #9202, May 16, 2000, pp. 1-3 http://web.archive.org/web/2001160751/www.ntsecurity.net/Articles/Index.cfm?ArticleId=9202 &SearchString=cyber.
"Network Vulnerability Assessment Report," Apr. 19, 2000, pp. 1-4, http://web.archive.org/web/20000917072109/documents.iss.net/literature/InternetScanner/reports/Line_Mgmt_Vulnerability_Assessment_Report.pdf.
"Host Vulnerability Summary Report," Apr. 19, 2000, pp. 1-8, http://web.archive.org/web/20000917072216/documents.iss.net/literature/InternetScanner/reports/Technician_Host_Vulnerability_Summary_Report.pdf.
Internet Security Systems, Inc.: Securing E-Business, ISS SAFEsuite products, Security Assessment: Internet Scanner, archived Aug. 20, 2000 http://web.archive.org/web/20000820203428/www.iss.net/securing_e-business/security_pr . . . .
"Internet Security Systems; Internet Scanner", archived Jun. 6, 2001, pp. 1-2 http://web.archive.org/web/2001060422406/documents.iss.net/literature/InternetScanner/is_ps.pdf.
"To Setup Secure PC Network:", archived Aug. 16, 2000, pp. 1-15 http://web.archive.org/web/20000816192628/www.citadel.com/downloads/SPC+readme.txt.

(56) References Cited

OTHER PUBLICATIONS

"Microsoft Security Glossary", published Oct. 29, 2002, updated Dec. 19, 2005, pp. 1-18, www.microsoft.com/security/glossary.mspx.

U.S. Appl. No. 60/234,680, filed Sep. 22, 2000.

Gravitix Screenshot, Jul. 24, 2000.

Office Action Summary in U.S. Appl. No. 14/499,230 dated Jan. 8, 2015.

Office Action Summary in U.S. Appl. No. 14/499,250 dated Jan. 16, 2015.

US 8,528,042, 09/2013, Sapp et al. (withdrawn)

* cited by examiner

ANTI-VULNERABILITY SYSTEM, METHOD, AND COMPUTER PROGRAM PRODUCT

CROSS-REFERENCE TO RELATED APPLICATIONS

This application is a continuation-in-part (for the purposes of providing a glossary in accordance with the Glossary Pilot Program) of U.S. patent application Ser. No. 14/138,014 filed Dec. 21, 2013, now co-pending, which, in turn, is a continuation of U.S. patent application Ser. No. 10/882,852 filed Jul. 1, 2004, now co-pending, which, in turn, claims priority to U.S. App. No. 60/484,085 filed Jul. 1, 2003, which are all incorporated herein by reference in their entirety for all purposes.

FIELD OF THE INVENTION

The present invention relates to computer systems, and more particularly to management of security of computing and network devices that are connected to other such devices.

SUMMARY

A system, method, and computer program product are provided for identifying a first and second occurrence in connection with at least one of the networked device. In use, it is possible that it is determined that the at least one actual vulnerability of the at least one networked device is capable of being taken advantage of by the first occurrence identified in connection with the at least one networked device. Further, it is also possible that it is determined that the at least one actual vulnerability of the at least one networked device is not capable of being taken advantage of by the second occurrence identified in connection with the at least one networked device. To this end, the first occurrence and the second occurrence are reported differently.

DETAILED DESCRIPTION

Figure 1:
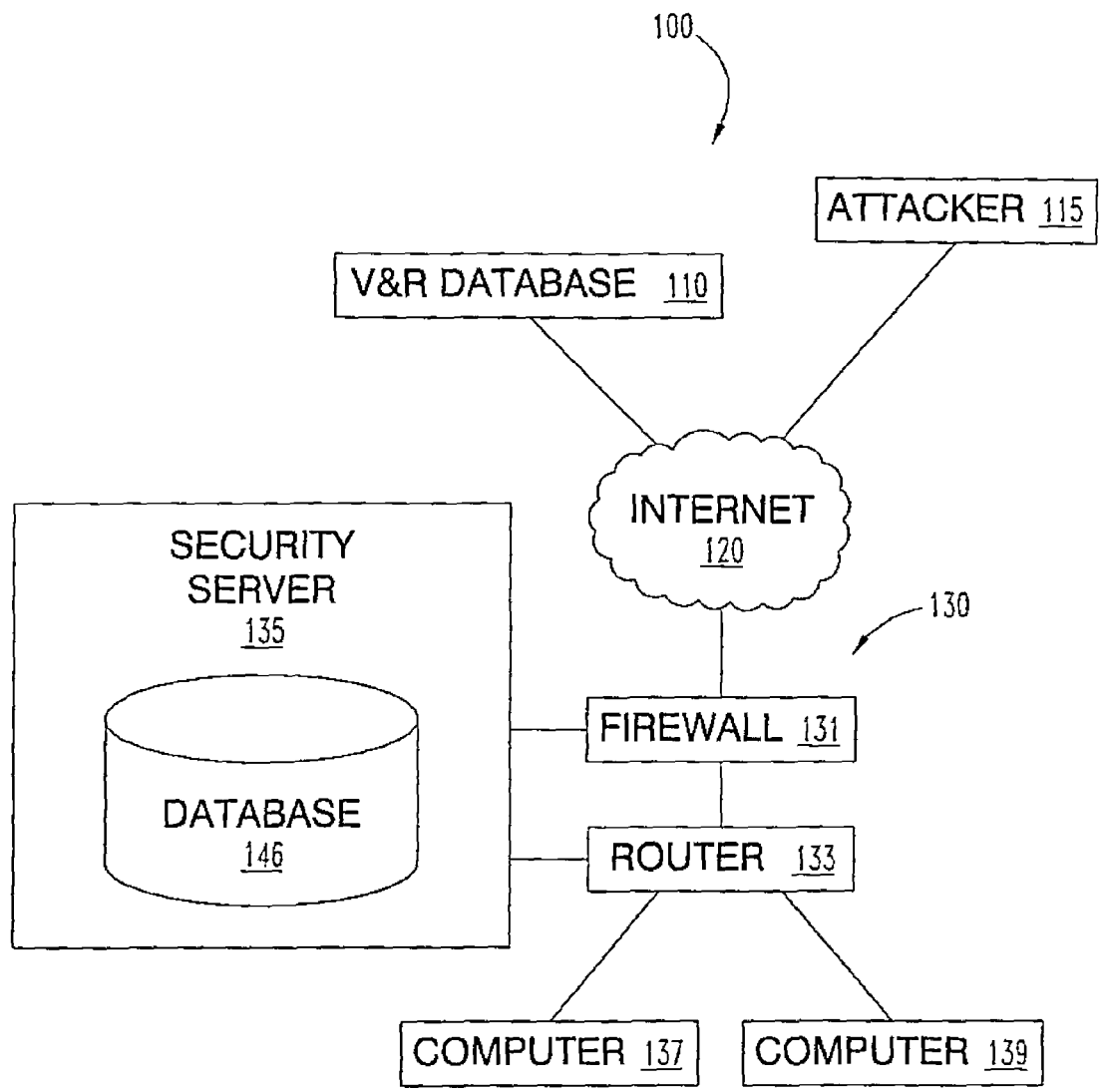
FIG. 1 is a block diagram of a networked system of computers in one embodiment of the present invention.

Glossary
  data warehouse=a component that contains vulnerabilities and updates for devices that operate on at least one network.
  NOC server=network operations center server that periodically synchronize latest vulnerability and update data with other servers.
  SDK=software development kit that allows programmers to develop security applications that access data collected in a database.
  CM application=change management application that controls documentation and logging of change.

For the purpose of promoting an understanding of the principles of the present invention, reference will now be made to the embodiment illustrated in the drawings and specific language will be used to describe the same. It will, nevertheless, be understood that no limitation of the scope of the invention is thereby intended; any alterations and further modifications of the described or illustrated embodiments, and any further applications of the principles of the invention as illustrated therein are contemplated as would normally occur to one skilled in the art to which the invention relates.

Generally, the present invention in one embodiment operates in the context of a network as shown in FIG. 1. System 100 includes a vulnerability and remediation database 110 connected by Internet 120 to subnet 130. In this exemplary embodiment, firewall 131 serves as the gateway between Internet 120 and the rest of subnet 130. Router 133 directs connections between computers 137 and each other and other devices on Internet 120. Server 135 collects certain information and provides certain data services that will be discussed in further detail herein.

In particular, security server 135 includes processor 142, and memory 144 encoded with programming instructions executable by processor 142 to perform several important security-related functions. For example, security server 135 collects data from devices 131, 133, 137, and 139, including the software installed on those devices, their configuration and policy settings, and patches that have been installed. Security server 135 also obtains from vulnerability and remediation database 110 a regularly updated list of security vulnerabilities in software for a wide variety of operating systems, and even in the operating systems themselves. Security server 135 also downloads a regularly updated list of remediation techniques that can be applied to protect a device from damage due to those vulnerabilities. In one embodiment, each vulnerability in remediation database 110 is identified by a vulnerability identifier, and the vulnerability identifier can be used to retrieve remediation information from database 110 (and from database 146, discussed below in relation to FIG. 2).

In one embodiment, computers 137 and 139 each comprise a processor 152, 162, memory 154, 164, and storage 156, 166. Computer 137 executes a client-side program (stored in storage 156, loaded into memory 154, and executed by processor 152) that maintains an up-to-date collection of information regarding the operating system, service pack (if applicable), software, and patches installed on computer 137, and the policies and configuration data (including configuration files, and elements that may be contained in files, such as *.ini and *.conf files and registry information, for example), and communicates that information on a substantially real-time basis to security server 135. In an alternative embodiment, the collection of information is not retained on computer 137, but is only communicated once to security server 135, then is updated in real time as changes to that collection occur.

Computer 139 stores, loads, and executes a similar software program that communicates configuration information pertaining to computer 139 to security server 135, also substantially in real time. Changes to the configuration registry in computer 139 are monitored, and selected changes are communicated to security server 135 so that relevant information is always available. Security server 135 may connect directly to and request software installation status and configuration information from firewall 131 and router 133, for embodiments wherein firewall 131 and router 133 do not have a software program executing on them to communicate this information directly.

This collection of information is made available at security server 135, and combined with the vulnerability and remediation data from source 110. The advanced functionality of system 100 is thereby enabled as discussed further herein.

Figure 2:
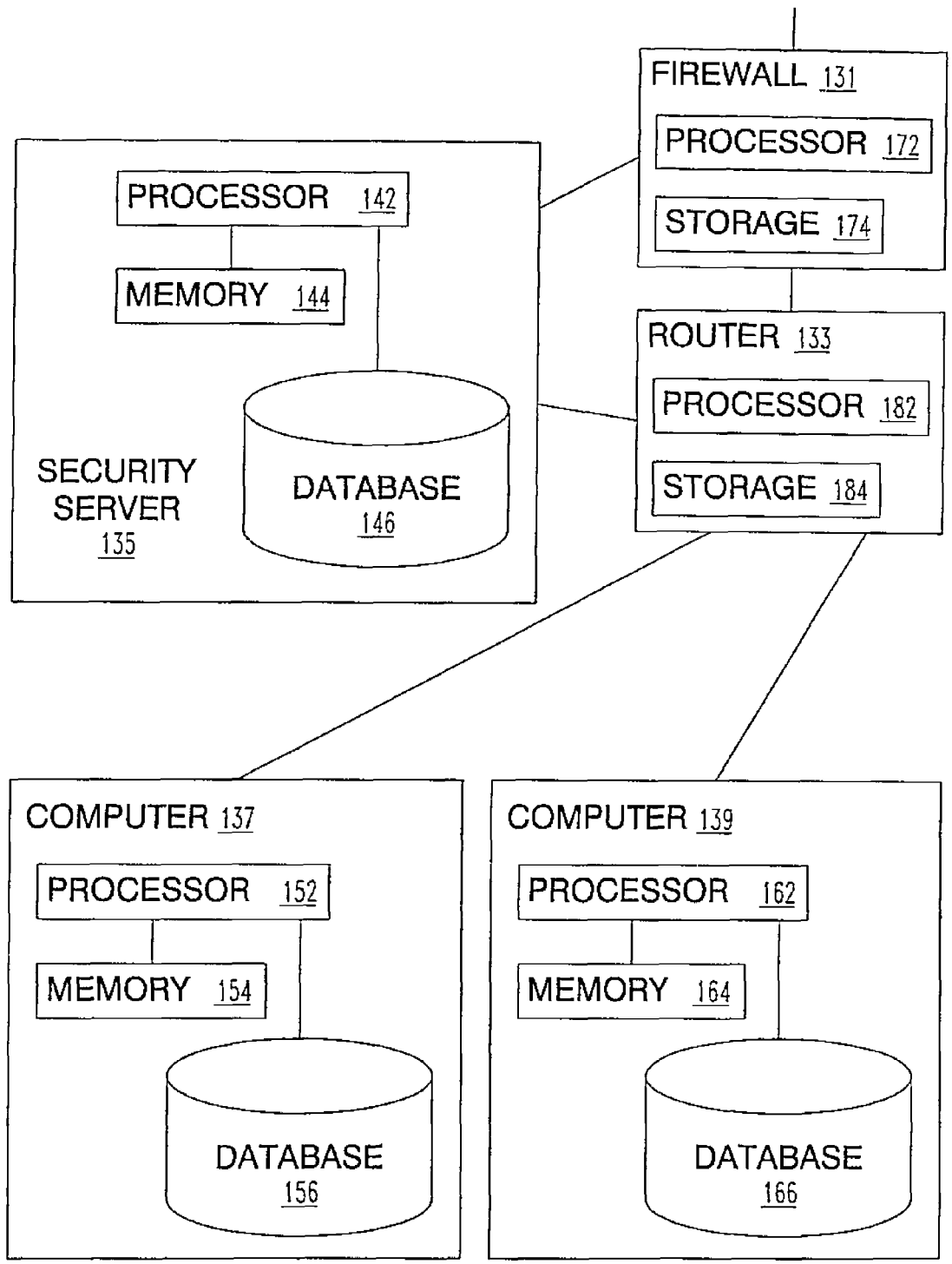
FIG. 2 is a block diagram showing components of several computing devices in the system of FIG. 1.

Turning to FIG. 2, one sees additional details and components of the devices in subnet 130. Computers 137 and 139 are traditional client or server machines, each having a processor 152, 162, memory 154, 164, and storage 156, 166. Firewall 131 and router 133 also have processors 172, 182 and storage 174, 184, respectively, as is known in the art. In this embodiment, devices 137 and 139 each execute a client-side program that continuously monitors the software installation and configuration status for that device. Changes to that status are communicated in substantially real time to security server 135, which continuously maintains the information in database 146. Security server 135 connects directly to firewall 131 and router 133 to obtain software installation and configuration status for those devices in the absence of a client-side program running thereon.

Processors 142, 152, 162 may each be comprised of one or more components configured as a single unit. Alternatively, when of a multi-component form, processor 142, 152, 162 may each have one or more components located remotely relative to the others. One or more components of processor 142, 152, 162 may be of the electronic variety defining digital circuitry, analog circuitry, or both. In one embodiment, processor 142, 152, 162 are of a conventional, integrated circuit microprocessor arrangement, such as one or more PENTIUM 4 or XEON processors from INTEL Corporation of 2200 Mission College Boulevard, Santa Clara, Calif., 95052, USA, or ATHLON XP processors from Advanced Micro Devices, One AMD Place, Sunnyvale, Calif., 94088, USA.

Memories 144, 154, 164 may include one or more types of solid-state electronic memory, magnetic memory, or optical memory, just to name a few. By way of non-limiting example, memory 40b may include solid-state electronic Random Access Memory (RAM), Sequentially Accessible Memory (SAM) (such as the First-In, First-Out (FIFO) variety or the Last-In First-Out (LIFO) variety), Programmable Read Only Memory (PROM), Electrically Programmable Read Only Memory (EPROM), or Electrically Erasable Programmable Read Only Memory (EEPROM); an optical disc memory (such as a DVD or CD ROM); a magnetically encoded hard drive, floppy disk, tape, or cartridge media; or a combination of any of these memory types. Also, memories 144, 154, 164 may be volatile, nonvolatile, or a hybrid combination of volatile and nonvolatile varieties.

In this exemplary embodiment, storage 146, 156, 166 comprises one or more of the memory types just given for memories 144, 154, 164, preferably selected from the non-volatile types.

Figure 3:
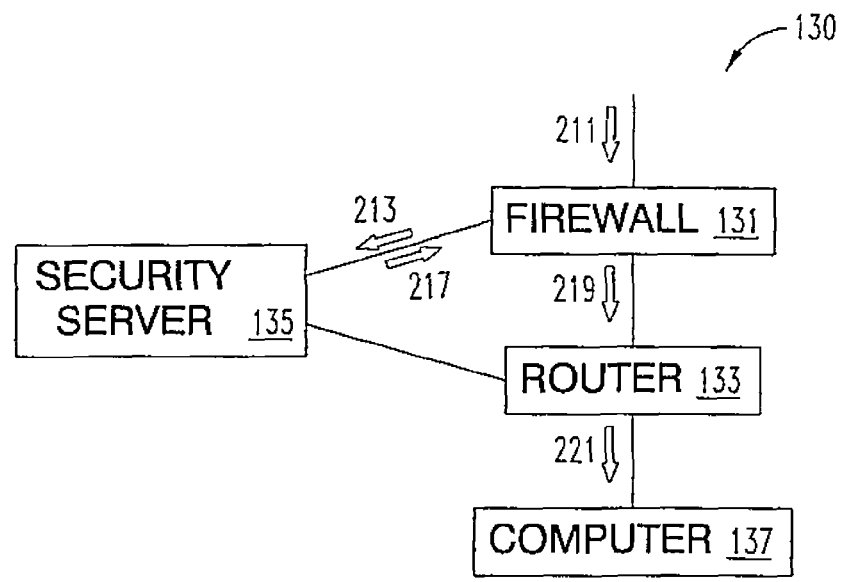
FIGS. 3 and 4 trace signals that travel through the system of FIGS. 1 and 2 and the present invention is applied to them.

This collection of information is used by system 100 in a wide variety of ways. With reference to FIG. 3, assume for example that a connection request 211 arrives at firewall 131 requesting that data be transferred to computer 137. The payload of request 211 is, in this example, a probe request for a worm that takes advantage of a particular security vulnerability in a certain computer operating system. Based on characteristics of the connection request 211, firewall 131 sends a query 213 to security server 135. Query 213 includes information that security server 135 uses to determine (1) the intended destination of connection request 211, and (2) some characterization of the payload of connection request 211, such as a vulnerability identifier. Security server 135 uses this information to determine whether connection request 211 is attempting to take advantage of a particular known vulnerability of destination machine 137, and uses information from database 146 (see FIG. 2) to determine whether the destination computer 137 has the vulnerable software installed, and whether the vulnerability has been patched on computer 137, or whether computer 137 has been configured so as to be invulnerable to a particular attack.

Security server 135 sends result signal 217 back to firewall 131 with an indication of whether the connection request should be granted or rejected. If it is to be granted, firewall 131 passes the request to router 133 as request 219, and router 133 relays the request as request 221 to computer 137, as is understood in the art. If, on the other hand, signal 217 indicates that connection request 211 is to be rejected, firewall 133 drops or rejects the connection request 211 as is understood in the art.

Figure 4:
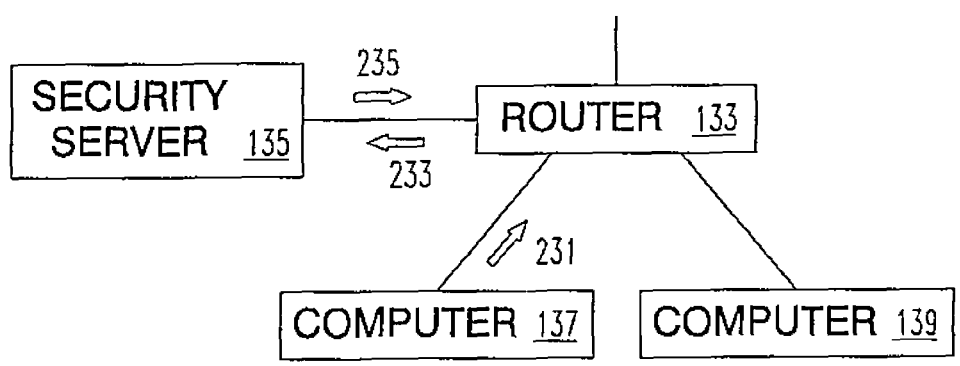

Analogous operation can protect computers within subnet 130 from compromised devices within subnet 130 as well. For example, FIG. 4 illustrates subnet 130 with computer 137 compromised. Under the control of a virus or worm, for example, computer 137 sends connection attempt 231 to router 133 in an attempt to probe or take advantage of a potential vulnerability in computer 139. On receiving connection request 231, router 133 sends relevant information about request 231 in a query 233 to security server 135. Similarly to the operation discussed above in relation to FIG. 3, security server 135 determines whether connection request 231 poses any threat, and in particular any threat to software on computer 139. If so, security server 135 determines whether the vulnerability has been patched, and if not, it determines whether computer 139 has been otherwise configured to avoid damage due to that vulnerability. Security server 135 replies with signal 235 to query 233 with that answer. Router 133 uses response 235 to determine whether to allow the connection attempt.

In some embodiments, upon a determination by security server 135 that a connection attempt or other attack has occurred against a computer that is vulnerable (based on its current software, patch, policy, and configuration status), security server 135 selects one or more remediation techniques from database 146 that remediate the particular vulnerability. Based on a prioritization previously selected by an administrator or the system designer, the remediation technique(s) are applied (1) to the machine that was attacked, (2) to all devices subject to the same vulnerability (based on their real-time software, patch, policy, and configuration status), or (3) to all devices to which the selected remediation can be applied.

In various embodiments, remediation techniques include the closing of open ports on the device; installation of a patch that is known to correct the vulnerability; changing the device's configuration; stopping, disabling, or removing services; setting or modifying policies; and the like. Furthermore, in various embodiments, events and actions are logged (preferably in a non-volatile medium) for later analysis and review by system administrators. In these embodiments, the log also stores information describing whether the target device was vulnerable to the attack.

A real-time status database according to the present invention has many other applications as well. In some embodiments, the database 146 is made available to an administrative console running on security server 135 or other administrative terminal. When a vulnerability is newly discovered in software that exists in subnet 130, administrators can immediately see whether any devices in subnet 130 are vulnerable to it, and if so, which ones. If a means of remediation of the vulnerability is known, the remediation can be selectively applied to only those devices subject to the vulnerability.

In some embodiments, the database 146 is integrated into another device, such as firewall 131 or router 133, or an individual device on the network. While some of these embodiments might avoid some failures due to network instability, they substantially increase the complexity of the device itself. For this reason, as well as the complexity of maintaining security database functions when integrated with other functions, the network-attached device embodiment described above in relation to FIGS. 1-4 is one possible embodiment.

In one embodiment, a software development kit (SDK) allows programmers to develop security applications that access the data collected in database 146. The applications developed with the SDK access information using a defined application programming interface (API) to retrieve vulnerability, remediation, and device status information available to the system. The applications then make security-related determinations and are enabled to take certain actions based on the available data.

In these exemplary systems, "configuration information" for each device may take the form of initialization files (often named *.ini or *.conf), configuration registry (such as, the Windows Registry on Microsoft WINDOWS operating systems), or configuration data held in volatile or non-volatile memory. Such configuration information often determines what and how data is accepted from other devices, sent to other devices, processed, stored, or otherwise handled, and in many cases determines what routines and sub-routines are executed in a particular application or operating system.

In one embodiment, security information management system is provided, wherein a database of potential vulnerabilities is maintained, along with data describing remediation techniques (patches, policy settings, and configuration options) available to protect against them. At least one vulnerability is associated in the database with multiple available remediation techniques. In one embodiment, the system presents a user with the list of remediation techniques available to protect against a known vulnerability, accepts the user's selection from the list, and executes the selected technique. In other embodiments, the system uses a predetermined prioritization schedule to automatically select among the available remediation techniques, then automatically executes the selected technique.

One embodiment of the present invention is a database of information about a plurality of devices, updated in real-time and used by an application to make a security-related decision. The database stores data indicating the installed operating system(s), installed software, patches that have been applied, system policies that are in place, and configuration information for each device. The database answers queries by one or more devices or applications attached by a network to facilitate security-related decision making. In one form of this embodiment, a firewall or router handles a connection request or maintenance of a connection based on the configuration information stored in the database that relates to one or both of the devices involved in the transmission.

In one embodiment, database 146 includes vulnerability and remediation information such that, for at least one vulnerability, multiple methods of remediating the vulnerability are specified. When the system has occasion to implement or offer remediation of a vulnerability, all known alternatives are presented that are relevant to the device or machine's particular configuration or setup. For example, when a vulnerability of a device is presented to an administrator, the administrator is given a choice among the plurality of remediation options to remediate the vulnerability. In some embodiments, the administrator can select a preferred type of remediation that will be applied if available and a fallback type. For example, an administrator may select application of a policy setting over installation of a software patch, so that the risk of disruption of critical business systems is minimized.

In other embodiments, an administrator or other user is presented with a set of user interface elements that identify multiple options for remediating and identifying the vulnerability. The administrator or user selects the method to be used, and that remediation is applied to the vulnerable device(s).

Figure 5A:
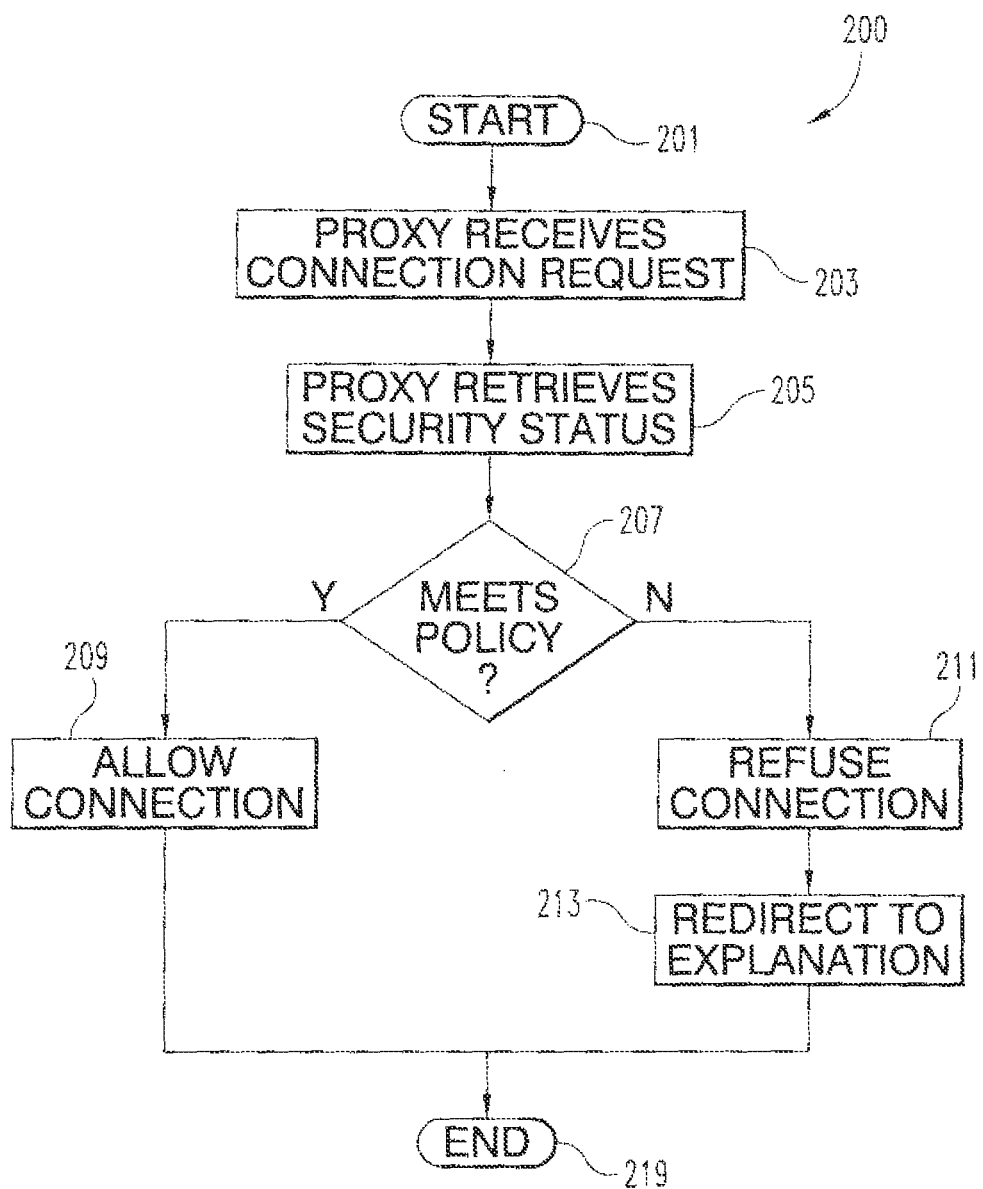
FIG. 5A is a flow chart of a filtering proxy method according to one embodiment of the present invention.

FIG. 5A is a flow chart of a filtering proxy method according to one embodiment of the present invention.

In use, a database maintains security status information on each device in a network, based on whether the device's operating system, software, and patches are installed and configured to meet a baseline level of security. A network gateway proxy blocks connection attempts from devices for which the database indicates a substandard security status, but allows connections from other devices to pass normally. The database is preferably updated on a substantially real-time basis by client-side software run by each device in the network.

Another form of the present embodiment includes a connection proxy that filters connections originating within the network. In particular, one embodiment employs a proxy that denies connection attempts originating with devices in the network when the originating device has a status, reflected in the database, that fails to meet predetermined security characteristics in terms of installed operating system and software, patch levels, and system policy and configuration registry information.

In this embodiment, router 133 serves as a connection proxy for devices and subnet 130, as will be understood by those skilled in the art. In addition to basic proxy functionality, however, router 133 accesses database 146 on security server 135 via the SDK at each connection attempt. If, for example, device 137 attempts to connect to any device where the connection must pass through the proxy server (router 133 in this example), such as a device on Internet 120, router 133 checks the security status of device 137 in database 146, using the real-time status therein to determine whether device 137 complies with one or more predetermined security policies. If it does, router 133 allows the connection to be made. If it does not, router 133 prevents the connection, preferably redirecting the connection to a diagnostic page that explains why the connection is not being made.

This system is illustrated by method 200 in FIG. 5A. Method 200 begins with start point 201. The proxy (router 133 in the above example) receives a connection request at block 203, then retrieves the security status of the source device at block 205. This preferably uses the real-time updated status information from database 146 (see FIG. 2) at decision block 207. If the security status indicates that the source device complies with the predetermined security policy, the proxy allows the connection at block 209. If not, the proxy refuses the connection at block 211 and redirects the connection to an explanation message (such as a locally generated web page or other message source) at block 213. In either case, method 200 ends at end point 219.

In possible embodiments, the determination and decision at block 207 apply a comprehensive minimum policy set that protects other devices in subnet 130 (see FIG. 1) from viruses, trojans, worms, and other malware that might be inadvertently and/or carelessly acquired due to the requested connection.

In another embodiment, a security information management system is provided, wherein client-side devices preferably collect and monitor information describing the operating system, software, and patches installed on the device(s), as well as configuration thereof. A database of this information is maintained, along with data describing vulnerabilities of available software and associated remediation techniques available for it. The system exposes an API to support security-related decisions by other applications. For example, an intrusion detection system (IDS) accesses the database to determine whether an actual threat exists and should be (or has been) blocked.

In another form of this embodiment, client software runs on each monitored device and reports configuration information to the database, so that the database has substantially real-time-current information.

The present embodiment of the present invention advantageously acquires the real-time status information from each client using client-side software. In this manner, a resource burden of monitoring is spread among the devices being monitored, and uses far fewer network resources in the process.

In these exemplary systems, "configuration information" for each device may take the form of initialization files (often named *.ini or *.conf), configuration registry (such as the Windows Registry on Microsoft Windows operating systems), or configuration data held in volatile or non-volatile memory. Such configuration information often determines what and how data is accepted from other devices, sent to other devices, processed, stored, or otherwise handled, and in many cases determines what routines and sub-routines are executed in a particular application or operating system.

In one embodiment, a system maintains a database of vulnerabilities and associated remediation techniques. The remediation techniques include software patches, policy settings or changes, and registry settings or changes. This multi-faceted provides novel flexibility in management of security issues, and convenience for security administrators in both determining available options and selecting remediation steps for vulnerable systems.

In another embodiment of the present invention, patches, policy changes, software updates, and configuration changes are rolled out to devices on a network using a staged roll-out technique. In this technique, the change is applied to a selected device or set of devices identified by an administrator. After a predetermined amount of time passes, unless the administrator has canceled the roll-out, the change is applied to an additional group of devices on the network. Third- and fourth-tier groups may also be identified by the administrator, where implementation of the remediation or upgrade is automatically effected in subsequent stages a predetermined amount of time after the preceding stage roll-out. Thus, if no failures are noted following a more limited roll-out (on a first set of devices), then the remediation or upgrade is automatically applied to other devices. If, on the other hand, an error or failure is observed, the subsequent roll-out can be canceled so that further failures and problems are avoided.

Figure 5B:
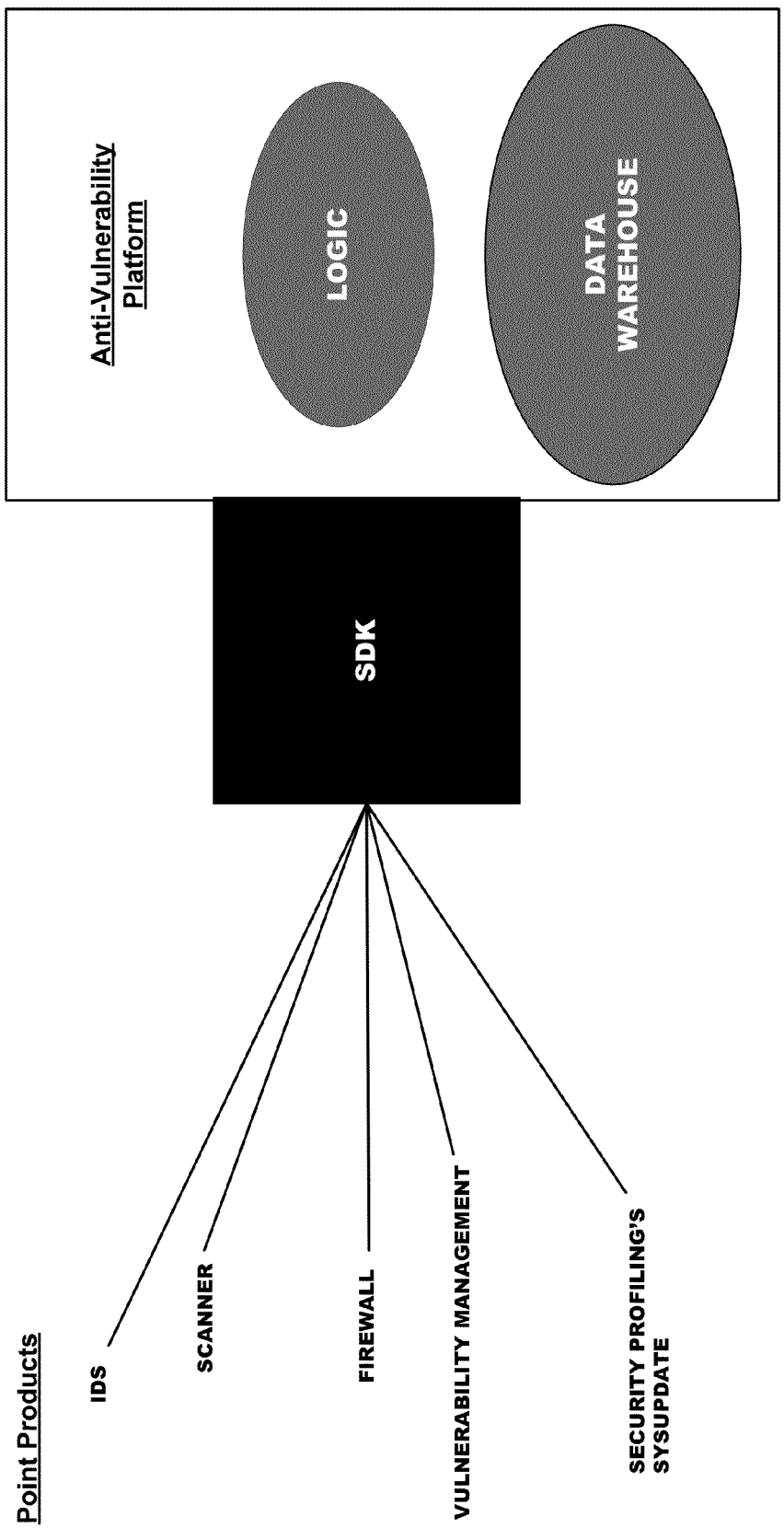
FIGS. 5B and 6 illustrate a platform, in accordance with possible embodiments.
Figure 6:
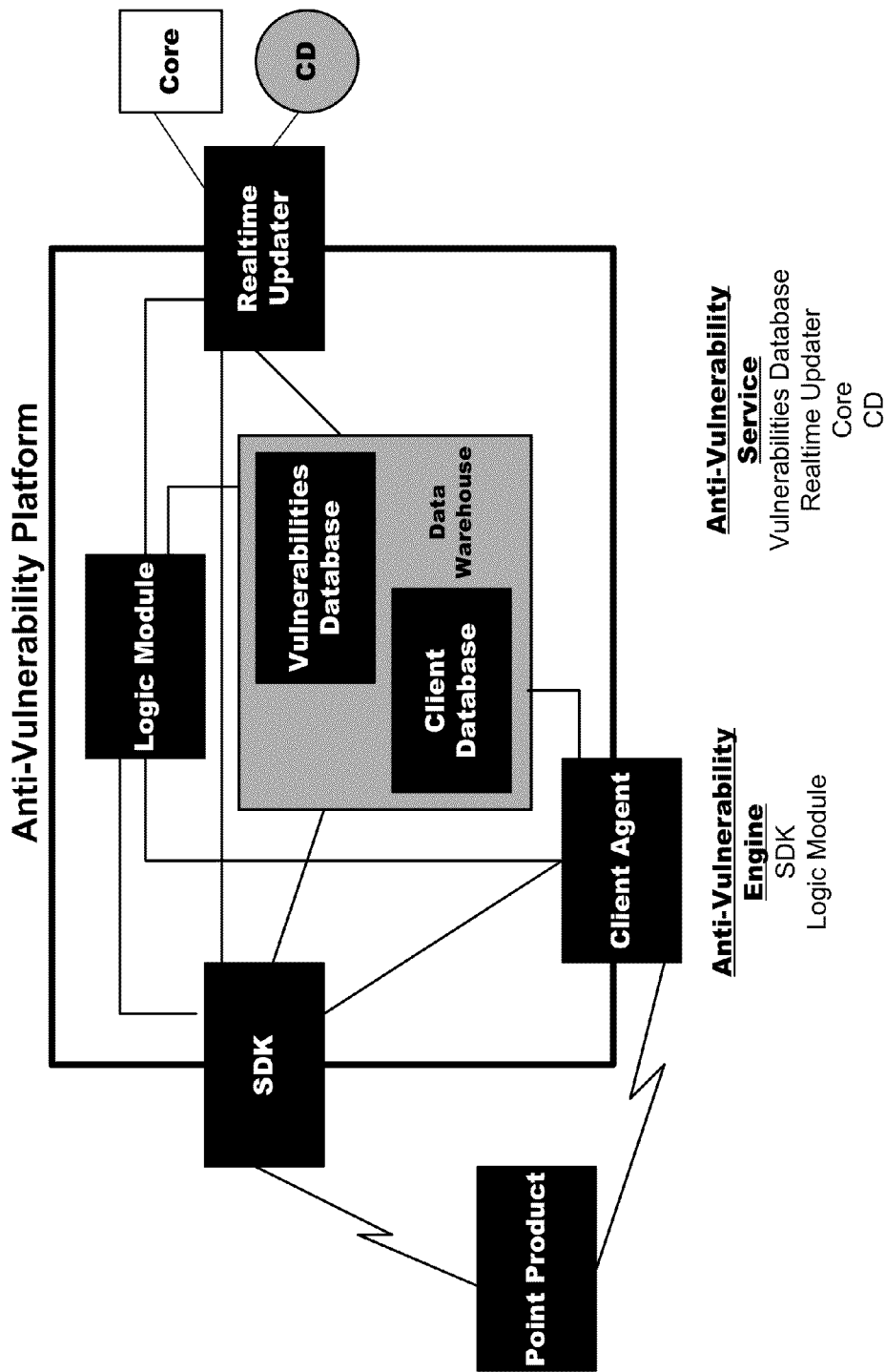

FIGS. 5B and 6 illustrate a platform, in accordance with possible embodiments.

In one possible embodiment, provided is a platform and underlying back end that includes a logic engine and vulnerability data warehouse. It may easily integrate with and enable network security products such as IDS, scanners, or firewalls to intelligently reference and share the same vulnerability data set, and independently provide complete vulnerability remediation (patching) functionalities such as that provided by the patch management and vulnerability remediation application. Thereby, the technology may improve system accuracy and efficiencies, minimize false positives and false negatives, and provide policy compliance and enforcement capabilities.

The latest network compromises are combining qualities of viruses, worms, and denial of service attacks into new blended attacks. Additionally, blended attacks may now utilize metamorphic or polymorphic abilities to change their signatures to avoid detection. To mitigate these new risks, organizations are now deploying a multi-tiered network defense strategy comprised of a variety of network security components layered at the perimeter and to internal network machines and devices. The security components are managed separately, and possibly their data is ported into a Security Information Management System (SIMS) correlation engine.

However, network security components and correlation engines rely on signatures or anomalies, producing an ever-increasing quantity of data, including false positive, benign, and erroneous events. They also lack the intelligence to identify, reference, or remediate the vulnerabilities targeted by the attack. Furthermore, the time and cost to acquire, manage, and maintain these numerous network security components is overwhelming the end user. Therefore, more sophisticated technology is provided to resolve these performance and management issues.

In one embodiment, technology may be provided that addresses these requirements by making each security component smarter and provides managers with remote remediation options. Thereby, improving system performance and streamlining management processes.

In one embodiment, an intelligent integration platform and SDK are provided to meet the above requirements.

In one embodiment, security products are enhanced and system intelligence may be provided. The same vulnerability data warehouse information is shared with the products so that more intelligent actions may then be taken to mitigate complex threats.

One embodiment cross-references the threat's identifier with the target's configuration. The threat's CVE ID, or other identifier, and the destination IP address are fed into the logic engine where it cross-references the threat with the machine's existing OS, application, and patch configuration profile. An answer is returned accurately indicating if the machine is vulnerable.

In one embodiment, network vulnerabilities are identified. The platform may independently identify which network machines and devices have vulnerabilities by querying a client agent, or a device's OS or firmware directly.

One embodiment proactively remediates the vulnerability. Once a vulnerability is identified, a remediation function may be provided that may remotely and automatically deploy the appropriate update to each machine or device, install it, and document it with change tracking and audit trail reports.

Examples of Anti-Vulnerability applications that may be integrated into network security products for enterprise and small office home office (SOHO) networks when integrated with one embodiment, via the SDK, will be described.

In one embodiment, update or patch deployment are provided, which remotely remediate network vulnerabilities and provide policy compliance and enforcement capabilities. And, for the consumer market, it may additionally support non-security related updates such as application version, performance, and bug-fix upgrades.

In one embodiment, an IDS may be provided that accurately determines if the targeted machine is actually vulnerable to an attack; virtually eliminates false positives and false negatives; and adds vulnerability remediation and policy compliance and enforcement functionalities.

In one embodiment, a scanner may be provided that virtually eliminates false positive and false negatives, and adds vulnerability remediation and policy compliance and enforcement functionalities.

In one embodiment, a firewall may be provided that virtually eliminates false positive and false negatives, preventing the security system from denying valid traffic to the organization—self-inflicted denial of service attacks—and adds vulnerability remediation, and policy compliance and enforcement functionalities.

In one embodiment, vulnerability management may be provided, as set forth above.

In one embodiment, multiple products are provided including an IDS, scanner, and firewall. Each may communicate with the same back-end data warehouse, sharing the same vulnerability information, attaining intelligence and more accurate information about the target and its vulnerabilities, thereby more effectively mitigating complex threats.

In one embodiment, change management may be provided, which may automatically create a change request in the system, specifying what update/patch is applicable to what system or groups of systems by vulnerability. After approval of the request, they may automatically deploy and install the update/patch. Finally, they may also verify correct operation after installation and automatically provide all necessary documentation and logging required.

Lastly, the platform may also provide product upgrades and signature updates to each of these various security products.

The platform is comprised of the following software components: SDK, client agent, logic engine, and data warehouse stored on a dedicated on-site server. Network operations center (NOC) Servers periodically synchronize the customers' servers with the latest vulnerability and update data. See FIG. 5B.

The same client agent and on-site server support all security applications that are integrated onto the platform, thereby providing the added anti-vulnerability functionalities presented in the previous section.

There are two system requirements: TCP/IP connectivity, and supported network machines and devices. In one embodiment, platforms supported are set forth below in Table 1.

TABLE 1

All Windows Operating Systems and their applications
All UNIX variants
Cisco routers and firewalls
Toshiba network devices
Netgear network devices
Linksys network devices, including wireless access points Platform support is scalable to any network size or architecture; consumer, small office home office (SOHO), enterprise, and distributed networks.

In one embodiment, technology may be provided that includes a backend platform that includes a logic engine and vulnerability data warehouse. It may easily integrate with and enable network security products such as IDS, scanners, or firewalls to intelligently reference and share the same vulnerability data set, and independently provide complete vulnerability remediation (patching) functionalities such as that provided by the patch management and vulnerability remediation application, update application and the intelligent IDS. Thereby, the technology may improve system accuracy and efficiencies, minimize false positives and false negatives, and provide policy compliance and enforcement capabilities.

As shown in FIG. 5B, the technology may meet market requirements, presented in the next section.

For example, networks are probed at an ever-increasing frequency for vulnerabilities, which may be exploited with compromise attacks. To protect the network, administrators have traditionally set up perimeter defense strategies.

These strategies generally call for network managers to lock down core servers, and monitor/scan/filter all incoming and outgoing traffic at the network perimeter with several network security products such as antivirus and firewalls to identify and attempt to neutralize hackers and malicious code. In the past, these strategies worked well, however new threats are becoming more complex.

The latest malicious code may combine qualities of viruses, worms, and direct compromise attacks into new blended attacks. Virus payloads are becoming more complex and by using metamorphic or polymorphic abilities, viruses are able to change their signatures to avoid the fingerprint-type filtering that most applications employ.

To mitigate these new risks, organizations deploy a multi-tiered network defense strategy comprised of a variety of additional network security products layered at the perimeter and to internal network machines and devices. Such network security products include antivirus, firewall, scanners, and network and host based intrusion detection systems.

Each of these systems is based on specific signatures, rules, or anomalies of each attack and their variants, and do not identify and remediate the specific network vulnerabilities the attack is targeting. So each attack, and its variants, must be identified and analyzed, a signature prepared, then finally deployed to each point product on each customer's network. This process is uncoordinated among multiple disparate systems, and creates an ever-increasing number of signatures producing more and more attack alerts requiring immediate attention—many of which are erroneous. The security components are managed separately, and possibly their data is ported into a security information management system (SIMS) correlation engine.

Additionally, to proactively remediate the vulnerabilities the malicious code is targeting, administrators quickly and diligently update or "patch" each network machine and device, which is a time-consuming and costly process. Further compounding the burden on administrators, best practice and government compliance directives may require higher standards of network security and integrity to protect consumer privacy, and they are documented with change tracking and audit trail reports.

Therefore, it is increasingly difficult and costly to effectively mitigate new threats and manage numerous systems—particularly in an environment of rising security standards and policy compliance requirements.

Thus, the multi-tiered network defense strategy is falling short primarily for four reasons. First, there is an inability of multi-tiered network security products to communicate and share information necessary to mitigate blended threats, and minimize false positives and false negatives. The vulnerabilities targeted by malicious code are not accurately identified nor proactively remediated. The associated excessive aggregate cost of ownership of multiple systems. The excessive administrative burden and cost of managing and maintaining multiple systems.

Hence, there is a need to integrate systems, share information intelligently to better defend against blended threats, reduce management and cost requirements, and automate vulnerability identification and remediation functionalities, as presented in the high-level requirements.

In one embodiment, technology is provided to meet the following market requirements: integrate network security products to share information; provide system intelligence; and remediate network vulnerabilities.

In one embodiment, technology may integrate with and enable network security products to intelligently reference and share information from the same vulnerability data set, provide vulnerability identification and remediation functionalities, and efficiently meet policy compliance and enforcement requirements.

In one embodiment, the platform is a complimentary network security technology. When integrated into the defense strategy, it adds intelligence that more accurately and efficiently mitigates blended threats and offloads the time-consuming functions that burden network administrators.

In one embodiment, the platform enables network security products to share information via its proprietary logic engine to automatically cross-reference the threat identifier with the targeted machine's configuration to determine if it is actually vulnerable to that threat. Previously separate and uncoordinated processes are now more intelligent and automated, resulting in improved system accuracy and efficiency. Therefore the need to layer more and more point products and add a SIMS is reduced, in-turn decreasing the amount of data—particularly erroneous data—to manage. Subsequently, the costs to acquire, operate, and manage the additional multiple point products, and the need to implement a SIMS, are also reduced.

In one embodiment, the platform may also remotely and proactively remediate vulnerabilities by first determining which updates are needed and compatible with each machine or device, taking into account the OS, applications, or firmware installed. Then, the updates may be deployed, installed, and validated. Thereby, policy compliance is effectively and efficiently enforced, and documented.

In one embodiment, the present technology fulfills market requirements noted in the previous section. For example, it may integrate network security products and provides system intelligence. The same vulnerability data warehouse information is shared with all products so that more intelligent actions may then be taken to mitigate complex threats.

Still yet, it may cross-reference the threat's identifier with the target's configuration. The threat's CVE ID, or other identifier, and the destination IP address are fed into the logic engine where it cross-references the threat with the machine's existing OS, application, and patch configuration profile. An answer is returned accurately indicating if the machine is vulnerable. Thereby, minimizes erroneous, benign, and false positive data produced by each security product.

One embodiment identifies network vulnerabilities. The platform may independently identify which network machines and devices have vulnerabilities by querying a client agent, or a device's OS or firmware directly.

One embodiment proactively remediates the vulnerability. Once a vulnerability is identified, a remediation function may be provided that may remotely and automatically deploy the appropriate update to each machine or device, install it, and document it with change tracking and audit trail reports.

Various possible benefits include blended attacks being more effectively mitigated and the overwhelming management and maintenance burden on administrators to purchase, operate, and maintain multiple network security products being reduced, while increasing productivity, reducing costs, and more effectively and efficiently meeting policy compliance and enforcement requirements.

Table 2 illustrates a plurality of end user details.

TABLE 2

Supplements existing technology to better defend against blended attacks
Intelligently accesses the vulnerability data warehouse, and remediates vulnerabilities.
Offers policy compliance and enforcement functionality
Vulnerabilities may be automatically remediated, verified and documented, therefore enforcing compliance.
No additional software or hardware implementation costs
Anti-Vulnerability functionalities may be integrated into existing product platforms.
Reduces cost of ownership of multi network security products
Shared vulnerability data sets and added vulnerability remediation functionalities may reduce the number of network security products needed to adequately attain defense strategy requirements.
Reduces management and maintenance costs
Increased accuracy of vulnerability identification, remediation and policy enforcement, and reduction of false positives, false negatives and denial of service (DoS), significantly reduces management time and costs.
Manage more machines and devices on the network through one portal
Vulnerability remediation and policy compliance and enforcement may be integrated with existing security network security products, and their respective interfaces.
Minimize end user education/absorption costs
Anti-Vulnerability applications are transparently integrated, retaining pre-existing architecture, processes, and interfaces. Therefore, the end user experience remains the same, or improved with simplified or automated processes.
User experience remains the same - additional time or costs to understand and execute new technologies are minimized
Anti-Vulnerability applications may be integrated transparently and seamlessly, and the pre-existing operational processes and user interfaces are virtually unchanged.
Supports both the enterprise and SOHO networks
Data warehouse contains vulnerabilities and updates for many machines and devices that operate on both enterprise and SOHO networks.
Applications presented hereinafter Examples of applications that may be made available for enterprise and small office home office (SOHO) networks when integrated with Anti-Vulnerability technology via the SDK will now be set forth.

In one embodiment, update or patch deployment is provided. In one embodiment, a patch management and vulnerability remediation solution is provided. The technology enables products to add accurate vulnerability identification, remediation, verification, and policy compliance functions. With such technology, products may gain intelligence, accuracy and efficiency, eliminate false positives and false negatives, and ensure policy compliance, thereby saving the organization time and money. Such functionalities and benefits are available for both the enterprise and SOHO networks. And, for the consumer market, it may additionally support non-security related updates such as application version, performance, and bug-fix updates for widely distributed programs, which may optimize system performance and enhance the consumer experience.

In one embodiment, an IDS is provided. IDS products attempt to identify malicious code by signatures at both the network and host client level. While they may be able to identify malicious code by CVE ID or other identifier, and targeted machines by IP address, but they generally do not have the intelligence to determine if the any of the machines on the network are susceptible to that attack, or with finer granularity, if any machine has a specific vulnerability to that specific attack, or if the targeted vulnerability has already been patched. For example, if the malicious code has been written as a Windows based attack targeting a Windows vulnerability, is the Destination IP actually running Windows, or a UNIX variant? And, if Windows, is it vulnerable to the attack, or has it already been patched? IDS do not have the intelligence to answer these questions, and incident alerts are generated indiscriminately. Lastly, even if the targeted machine is vulnerable—it remains unremediated—an IDS does not have the capability to remediate it.

With the present embodiment, a product architect can integrate functionalities listed in the previous section to enable the IDS to access the Anti-Vulnerability logic engine and platform. It may then have the intelligence to determine if any machine on the network is susceptible to the attack, remediate the vulnerability, mitigate the attack, and verify policy compliance. Now, if no machines were susceptible to the attack, it is identified as an event but not an incident, no further data or alert is generated, and a management response is not required. Integrated products may gain intelligence, accuracy, and efficiency, eliminate false positives and false negatives, and ensure policy compliance, thereby saving the organization time and money. Such functionalities and benefits are available for both the enterprise and SOHO networks.

In one embodiment, scanners may be provided. Vulnerability scanners assess each machine on the network for vulnerabilities, and create lists of potential vulnerabilities to the system managers. The lists commonly contain many false positives and false negatives, burdening the system and managers with inaccuracies.

With the present embodiment, a product architect can integrate functionalities listed in the previous section to enable the scanner to access the logic engine and platform, and then have the intelligence to determine if the machine has actual vulnerabilities, remediate them, and verify policy compliance. Integrated products may gain intelligence, accuracy, and efficiency, eliminated false positives and false negatives, and ensured policy compliance, thereby saving the organization time and money.

In one embodiment, a firewall may be provided. "Smart" firewalls are based in part on signatures and other similar functionalities as the IDS products described above.

With the present embodiment, the firewall can determine whether an attack is valid or a false positive, thereby preventing the security system from denying valid traffic to the organization—self-inflicted DoS attacks. Such functionalities and benefits may be available for both the enterprise and SOHO networks.

In one embodiment, vulnerability management may be provided. Vulnerability management products enable managers to set policy and identify potential network vulnerabilities. They typically do not accurately identify each vulnerability on each network machine and device, nor remediate each vulnerability, meeting policy compliance enforcement requirements.

The present embodiment offers similar functionalities and benefits as the patch deployment products described above. In short, it enables products to add accurate vulnerability identification, remediation, verification, and policy compliance and enforcement. Such functionalities and benefits are available for both the enterprise and SOHO networks.

To this end, multiple products may be provided: IDS, scanner, firewall, and vulnerability management. Each product functions as the individual products noted above. Each may be deployed and operated on the network in a multi-tiered network defense strategy. They may be disparate system, and their signatures and update deployment schedules may vary. Therefore, the probability of mitigating a new and complex threat decreases, while management requirements and cost increases.

In one embodiment, they each may communicate with the same backend data warehouse, sharing the same vulnerability information, attaining intelligence and more accurate information about the target and its vulnerabilities, thereby more effectively mitigating complex threats. It may also enable the products to add accurate vulnerability identification, remediation, verification, and policy compliance and enforcement functionalities.

In one embodiment, change management (CM) may be provided. Existing CM applications control the documentation and logging of change throughout the enterprise. These applications ensure that an organization maintains consistent records of what happened and when. Currently administrators must independently recognize that a security patch/update must be deployed to a computer or group of computers.

The user enters the request in the system, through the pipelined process of change management the request would be approved, the patch/update would be manually installed by a user, then documented in the change management software that the process has been completed. While CM software assists in documentation, very little if any assistance may be provided to identify the patches/updates needed, nor verifying correct function after the update/patch is installed.

With the current possible embodiment, change management integration may greatly streamline this process further reducing total cost of ownership, ease of use, and a higher standard of documentation. The products may then automatically create a change request in the system, specifying what update/patch is applicable to what system or groups of systems by vulnerability. After approval of the request, they may automatically deploy and install the update/patch. Finally, they may also verify correct operation after installation and automatically provide all necessary documentation and logging required.

Lastly, one possible embodiment may also provide product upgrades and signature updates to each of these various security products—including all of the technology benefits such as ensuring compliance of signature versions, logging, reporting, and verification of installation.

Thus, one possible embodiment includes an intelligent platform that may supplement any existing defense strategy. Once integrated with the technology, security products may share the same vulnerability data set to improve automation and accuracy—increasing efficiencies and minimizing false positives and false negatives. It also enables remote identification, management, and remediation of network vulnerabilities, and provides update deployment, validation, and reporting capabilities. Thereby, the technology improves network security and integrity, mitigation of blended threats, while increasing productivity, reducing total cost ownership, and more effectively and efficiently attaining policy compliance and enforcement requirements.

One embodiment provides IDS intelligence, accuracy and remote patching functions—IDS data output integrated with the aforementioned platform via the SDK. The platform's underlying backend including a logic engine and vulnerability data warehouse provides the added functions and performance.

Conventional IDS produce an ever-increasing quantity of alert data, including erroneous and false positive data. They also lack the intelligence to identify or remediate the vulnerabilities targeted by the attack. Furthermore, the cost of the acquiring, managing, and maintaining conventional IDS is overwhelming the end user.

Therefore, a more sophisticated, intelligent technology is provided to resolve these issues. In one embodiment, an intelligent IDS is provided to meet market requirements. The alert data output from a distribution of Snort is integrated with the platform via the SDK, which may add the following functions.

In one embodiment, it cross-references the threat's identifier with the target's configuration. The CVE ID, or other identifier, and the Destination IP address are fed into the logic engine where it cross-references the threat with the machine's configuration profile.

In one embodiment, it virtually eliminates false positives and false negatives. The backend accurately determines in real time if the targeted machine is susceptible to the attack. And, if the machine is not susceptible, it is filtered and reported back as an event and not an incident. No further data or alert is generated, and a management response is not required.

In one embodiment, it remotely remediates the vulnerability. When a machine is identified as vulnerable to an attack, an incident, a remediation function may be provided to the administrator to remotely deploy the appropriate update to the machine or device, install it, verifies the files and hashes, and document it with change tracking and audit trail reports.

Table 3 sets forth a plurality of features.

TABLE 3

Supports Windows and UNIX variants
Determines if targeted machine is vulnerable to an attack in real time
Filters out erroneous, benign and false positive alerts
Remotely patches targeted vulnerabilities in one click
Installs in minutes To this end, erroneous, benign, and false positive data is filtered out, and incidents may be remotely remediated. Therefore, complex threats are more effectively and efficiently mitigated. Correspondingly, the management and maintenance burden on administrators is reduced, saving time and effort.

Figure 7:
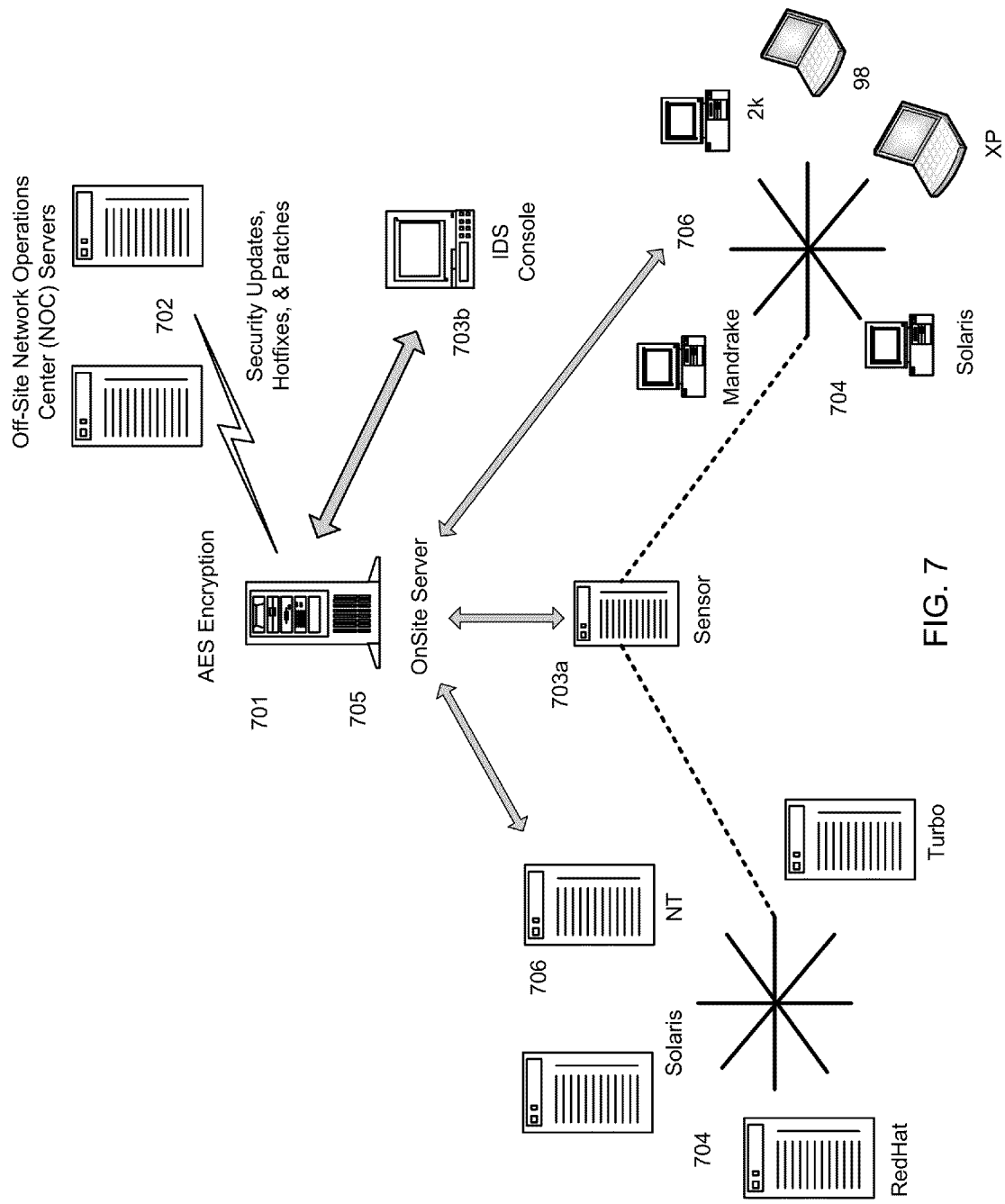
FIG. 7 illustrates an intelligent IDS, in accordance with one embodiment.

FIG. 7 illustrates an intelligent IDS, in accordance with one embodiment. As shown in 701, the on-site server periodically initiates communication with the NOC servers. In 702, updates are pulled from the NOC servers to the on-site server. In 703a, a sensor monitors and processes network traffic, and sends real time alert data to the on-site server where it cross-references the data with the backend. In 703b, centralized IDS console filters alerts; separating events from incidents. It also offers administrators remote patching function. In 704, agents are deployed to each client, accurately identifying which OS, apps, and updates are installed. In 705, the logic engine automatically determines which updates are needed to remediate the targeted machine. As shown in 706, appropriate updates are remotely deployed, installed, and validated on each client.

In one embodiment, the intelligent patch management and vulnerability remediation application automatically updates computer OS and application vulnerabilities before they can be exploited by hackers and viruses.

Networks are probed at an ever-increasing frequency for vulnerabilities, which may be exploited with directed compromise attacks. To protect the network, administrators must diligently update or "patch" server and workstation vulnerabilities, which is a time-consuming and costly process. Further compounding the burden on administrators, best practice and government compliance directives now require higher standards of network security to protect consumer privacy and proprietary data, which must be documented with change tracking and audit trail reports. Therefore, fully automated technology is provided to resolve these issues.

In one embodiment, a intelligent application called SysUpdate—the first technology to fully automate the updating and reporting processes, as described below.

In terms of function, one possible embodiment automatically researches updates. In collaboration with software development companies, it receives updates and their respective compatibility and installation guidelines, which are thoroughly reviewed and tested in a lab for system compatibility and stability. One embodiment automatically and securely downloads, and archives, all updates. Once the updates and guidelines are thoroughly reviewed and tested, they are automatically downloaded to each customer's on-site server, verified with MD5 hashes, and archived in a self-populating patch repository database.

One possible embodiment automatically determines the update and dependency requirements for all computers on a network, based on their individual operating systems, applications, and previously installed updates. The logic engine automatically matches the tested updates and their guidelines across each computer's configuration profile.

One possible embodiment remotely, securely, and automatically deploys updates to each computer and device. Updates may be tested on a test group, and then queued for release to each computer on the network, consistently in accordance with the policy determined by the network administrator.

One possible embodiment automatically verifies the updates are installed and running correctly. Each computer's client agent installs the updates, and verifies the files and hashes.

One possible embodiment automatically generates change tracking and audit trail reports. Change tracking and audit trail reports may be selected and printed from the management console reporting modules. Additionally, application license audit reports may be generated, which lists software installed on each machine, by license key.

Table 4 illustrates possible features in one embodiment.

TABLE 4

Figure 8:
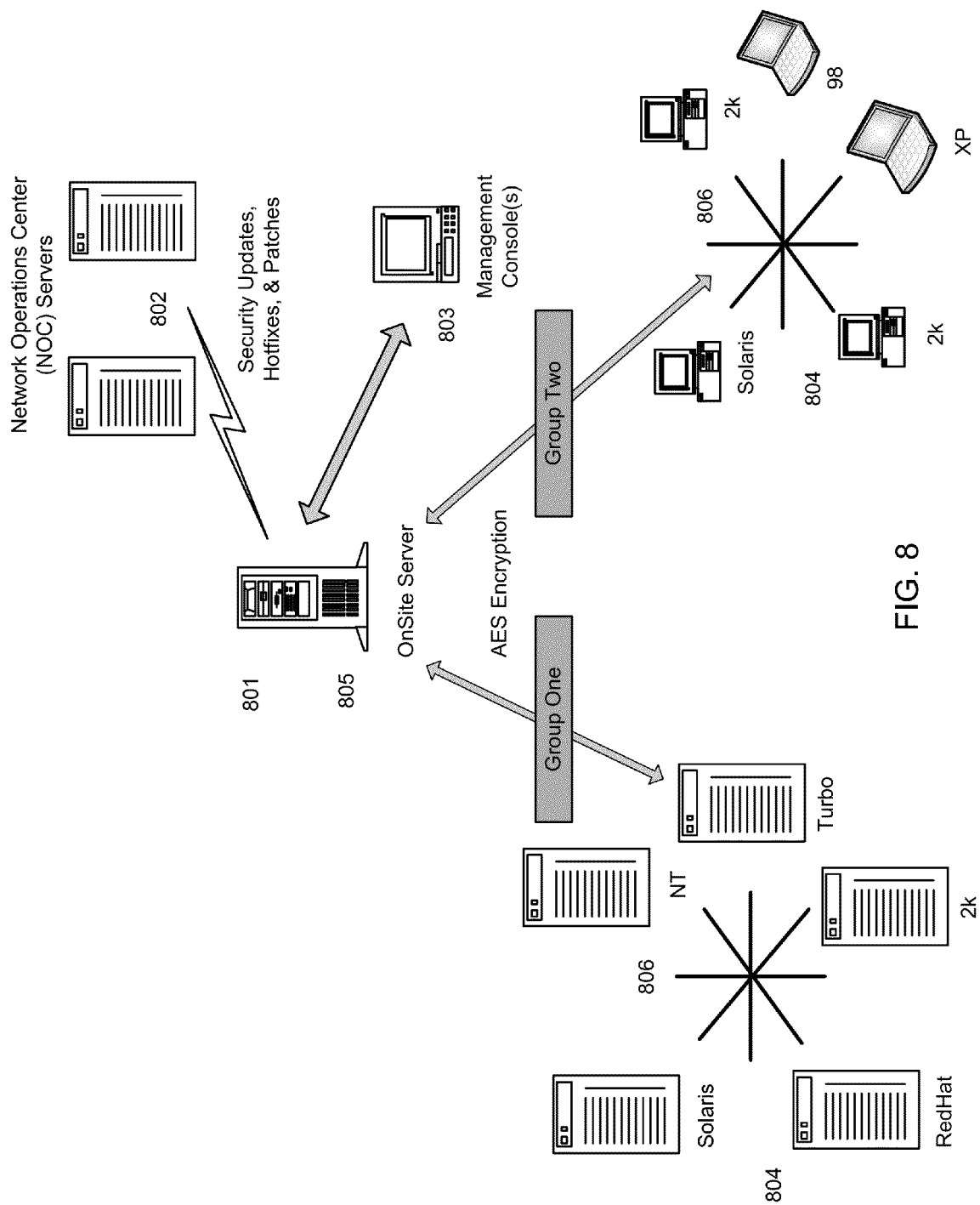
FIG. 8 illustrates an update system, in accordance with one embodiment.

Supports Windows, UNIX variants, and network devices
Supports non-Microsoft applications
Logic engine provides system intelligence
Files verified with SHA1 or MD5 hashes
MMC snap-in console with Crystal Reports
AES encryption FIG. 8 illustrates an update system, in accordance with one embodiment.

As shown in 801, the on-site server periodically initiates communication with the off-site NOC servers. In 802, updates are pulled from the NOC servers to the on-site server. In 803, the centralized MMC snap-in console offers flexible security policy options and comprehensive reporting capabilities. In 804. agents accurately identifies OS, apps, and updates installed on each client by file versions and hashes. In 805, logic engine automatically determines which updates are needed on each client, taking into account OS, app, and update dependencies. In 806, appropriate updates are automatically deployed, installed, and validated on each client.

In one embodiment, a secure computer log management application is provided with fully automated archiving, querying, and reporting options.

Best practice directives and government compliancy regulations now require administrators to archive log events over an extended period of time, and extensively document log and audit trail reports. With existing tools, these are time-consuming processes. Furthermore, existing tools transfer logs in clear text and are subject to malicious manipulation, and logs may be lost since few utilize guaranteed delivery protocols. Therefore, the integrity and security of the log data is not assured. In the event of an internal or external compromise, logs may be deleted, manipulated, or the network flooded with decoy log data.

The present possible embodiment automatically and continuously transfers logs from each computer into a self-configuring, self-populating, maintenance-free database where they may be archived for years on end. The transfer process utilizes AES encryption for authentication between the client and server, and a guarantee delivery protocol—ensuring no data is compromised or lost. Flexible cross-correlation queries may be run from a single, remote viewer console, and the data is then automatically formatted into reports.

In one embodiment, cross-correlation query type descriptions are provided. Such embodiment may provide the following three flexible cross-correlation queries in Table 5, which provide increasing detail and breadth of filtering/sorting capabilities, respectively.

TABLE 5

General Queries - This is the default query. It filters or sorts the logs of any one computer, by any one of the three log types.
Specific Queries - Detailed queries across all machines, and all log types.
Advanced Queries - Query across any combination of machines, by any combination of sources, events, and log types, over any period of time.

In one embodiment, features shown in Table 6 may be provided.

TABLE 6

Continuously pulls all logs into a central database, which may be archived for years on end
AES encryption and a guarantee delivery protocol ensure logs are not compromised or lost
Queries may be across any computer, for any log type, over any time frame
Automatically generates event log reports - ideal for documenting audit and compliance requirements
Easy download installation In one embodiment, automated reports may be provided. Query data is automatically formatted into professional reports Also, a separate reporting interface is available to generate general, machine, and user statistics. The present embodiment quickly and easily fulfills best practice and government compliance requirements for log event archiving and reporting.

Figure 9:
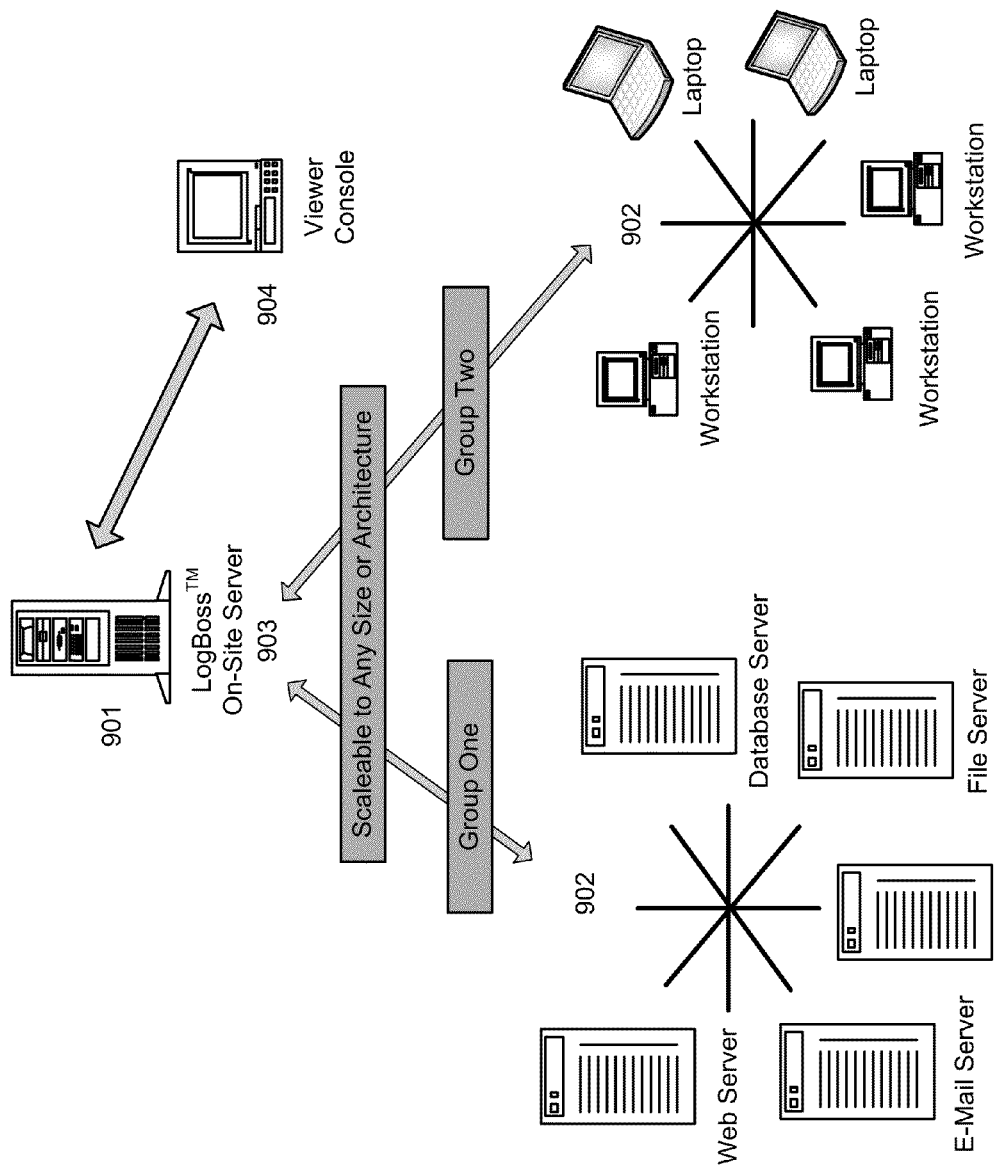
FIG. 9 shows a configured network, in accordance with one embodiment.

FIG. 9 shows a configured network, in accordance with one embodiment.

As shown in 901, the server component automatically configures the application, and the database and communicates with the client agents. In 902, client agents are deployed, which then identifies, manages, and continuously transfers all logs to the server. In 903, all client log data may be automatically archived the self-populating database, for years on end. In 904, from the centralized viewer, general, specific, or advanced cross-correlation queries may be run. See Table 7. Query and statistics data is automatically formatted into professional reports to easily document audit and compliance requirements.

TABLE 7

| Filter/Sort By: | General | Specific | Advanced |
|---|---|---|---|
| # of Computers | Any One | Any One | Any |
| # of Log Types | Any One | All | Any |
| Period of Time | Last or All | Last or All | Any |
| # of Event Detail Fields* | By ID Only | Any One | Any |

*Defined as Time/Date Written, UserID, ComputerID, EventID, Source, Type, and Category One possible embodiment provides best practice security policy templates to proactively and remotely manage and enforce enterprise security compliance policies.

Best practice and government compliance directives require higher standards of network security to protect consumer privacy and proprietary data, which must be consistently enforced, and documented with change tracking and audit trail reports for compliance verification. Therefore, a fully automated technology is provided to resolve these issues.

One embodiment offers an intelligent application to manage and enforce security policies—the first technology to fully automate the policy configuration, enforcement, and reporting processes, as described below.

In one embodiment, centralized, remote management is provided. The policy compliance and enforcement module is managed via the centralized management console—in MMC format, and automates the deployment, assessment, and enforcement of the policy chosen.

One embodiment provides standardized policies selected from many standardized policy templates recommended by NSA, SANS, US Navy, and ISO 17799, or custom policy options to formulate policies that meet the individual needs of any organization.

One possible embodiment automatically determines out-of-compliance parameters for all computers and devices on a network. Based on each client's individual policy parameter settings and configuration profile, the system's logic engine automatically reports back each client's out-of-compliance parameters.

In one embodiment, it remotely, securely, and automatically enforces policy to each computer or device. Policy changes may be automatically enforced to each computer or device individually, or by group, consistently in accordance with the policy selected by the network administrator. Policy configuration profiles are transmitted between client agent and server in an AES encrypted format for security and privacy. Policy options may be rolled back with one-click.

Automatically generates change tracking and audit trail reports. Change tracking and audit trail reports may be selected and printed from the Management Console's Reporting Center. Table 8 sets forth some possible features.

TABLE 8

Figure 10:
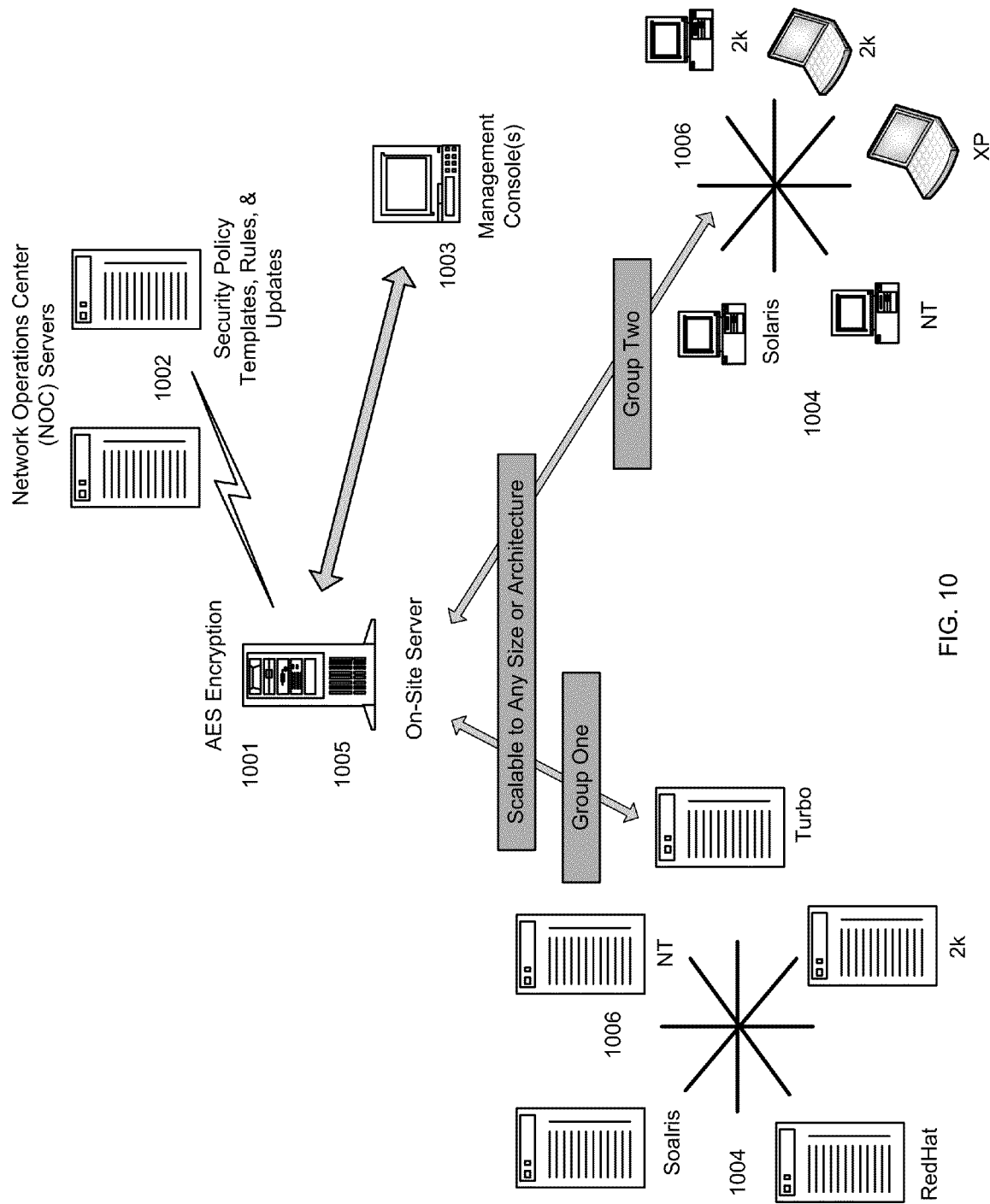
FIG. 10 shows policy compliance and enforcement, in accordance with one embodiment.

Supports Windows, UNIX variants, and network devices
Supports NSA, SANS, Navy, ISO 17799 and other standardized policies
Logic engine provides system intelligence
One-click policy rollback
Automatically generates change tracking and audit trail reports FIG. 10 shows policy compliance and enforcement, in accordance with one embodiment.

As shown in 1001, the on-site server periodically initiates communication with the off-site NOC servers. In 1002, templates, rules, and updates are pulled from the NOC servers to the on-site server. In 1003, a centralized management console offers flexible security policy templates, options, and comprehensive reporting capabilities. In 1004, agents are automatically deployed to each client, accurately identifying which policy parameters, OS, apps, and updates are applied or installed. In 1005, a logic engine automatically determines which clients are out of compliance. In 1006, appropriate policy changes are automatically enforced on each client.

In one embodiment an intelligent IPS may be provided that provides intelligence, accuracy, real-time prevention, and remote patching functions. In one embodiment, it accurately identifies and prevents malicious code from reaching their destination at the in-line IPS Sensor. Thereafter, a security officer may remotely patch the targeted vulnerability.

Conventional IDS/IPS produce an ever-increasing quantity of alert data, including erroneous and false positive data. They also lack the intelligence to identify or remediate the vulnerabilities targeted by the attack. Furthermore, the cost of the acquiring, managing, and maintaining conventional IPS is overwhelming the end user.

Therefore, a more sophisticated, intelligent technology is provided to resolve these issues, by offering an intelligent IPS to meet market requirements. The alert data output from a standard distribution of Snort is integrated with the platform via the SDK which accurately identifies attacks, and the attack is terminated at the in-line sensor—as described in the following functions.

One embodiment cross-references the threat's identifier with the target's configuration. The in-line Sensor monitors and processes traffic and sends alert data to the on-site server where its logic engine queries the backend in real-time to determine if the destination IP is vulnerable to the attack.

One possible embodiment provides enhanced flex response. If the destination IP is vulnerable to the attack, the in-line Sensor is commanded to immediately drop the exploit packets—preventing the attack. Further, it remotely remediates the vulnerability. When a machine is identified as vulnerable to an attack, an incident, a remediation function is also provided to the administrator to remotely deploy the appropriate update to the machine or device, install it, verifies the files and hashes, and documents it with change tracking and audit trail reports.

In one embodiment, attacks are accurately identified and mitigated before they reach their targets, and targeted vulnerabilities may be remotely remediated. Therefore, complex threats are more effectively and efficiently mitigated. Correspondingly, the management and maintenance burden on administrators is reduced, saving time and effort.

Table 9 illustrates some possible features.

TABLE 9

Figure 11:
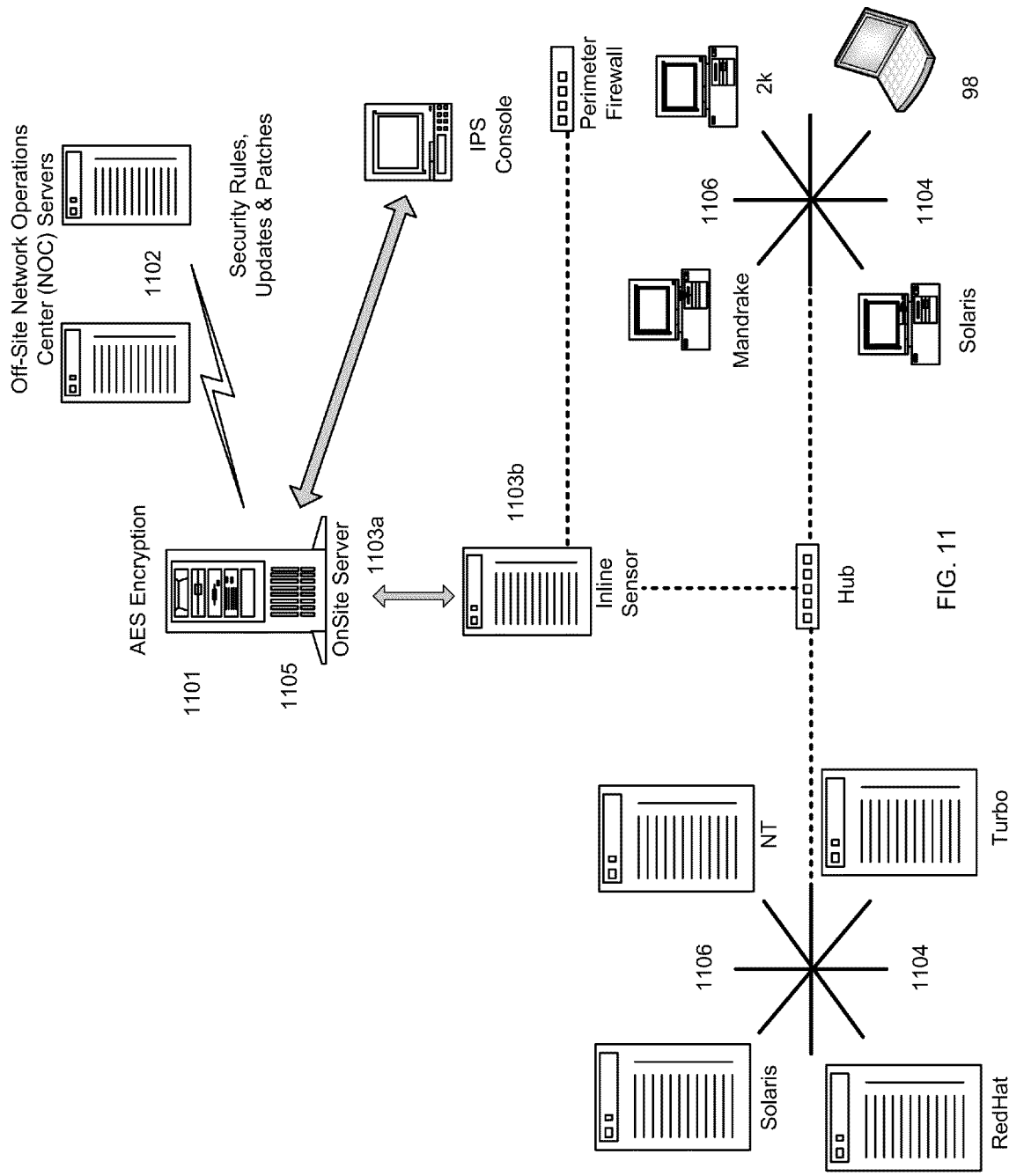
FIG. 11 illustrates an intelligent IPS, in accordance with one embodiment.

Supports Windows and UNIX variants
Determines in real-time if targeted machine is vulnerable to an attack, virtually eliminating false positives
in-line Sensor flex response terminates the attack
Remotely patches targeted vulnerabilities in one click
Installs in minutes FIG. 11 illustrates an intelligent IPS, in accordance with one embodiment.

As shown in 1101, the on-site server periodically initiates communication with the NOC servers. In 1102, updates are pulled from the NOC servers to the on-site server.

In 1103a, an IPS in-line sensor monitors and processes network traffic, and sends real time alert data to the on-site server where it cross-references the data with the backend. In 1103b, if the destination IP is vulnerable to the attack, the in-line Sensor is commanded in real-time to drop the malicious packets. As shown in 1104, agents are deployed to each client, accurately identifying which OS, apps, and updates are installed. In 1105, the logic engine automatically determines which updates are needed to remediate the targeted machine, and may be remotely deployed from the IPS console. In 1106, appropriate updates are remotely deployed, installed, and validated on each client.

In one embodiment, an anti-vulnerability SDK is provided. The SDK was designed to be a simple integration pathway to the Anti-Vulnerability platform backend. The SDK is documented and deliverable. The SDK is compatible with many different programming languages such as C, C++, VB, Java, and others.

The technology is sophisticated, yet all of the details of managing the communications are implemented in the library, requiring the developer to only learn a simple function calls as detailed hereinafter. A product architect chooses the functionality desired, inserts the provided functionality SDK code into the product code. The SDK code may then query—via the logic engine—the data warehouse, and in turn may return an answer to the point product. The architect can then show the results in any format desired in the product's interface. Full vulnerability remediation and policy compliance and enforcement functionalities may be integrated as well.

Figure 12:
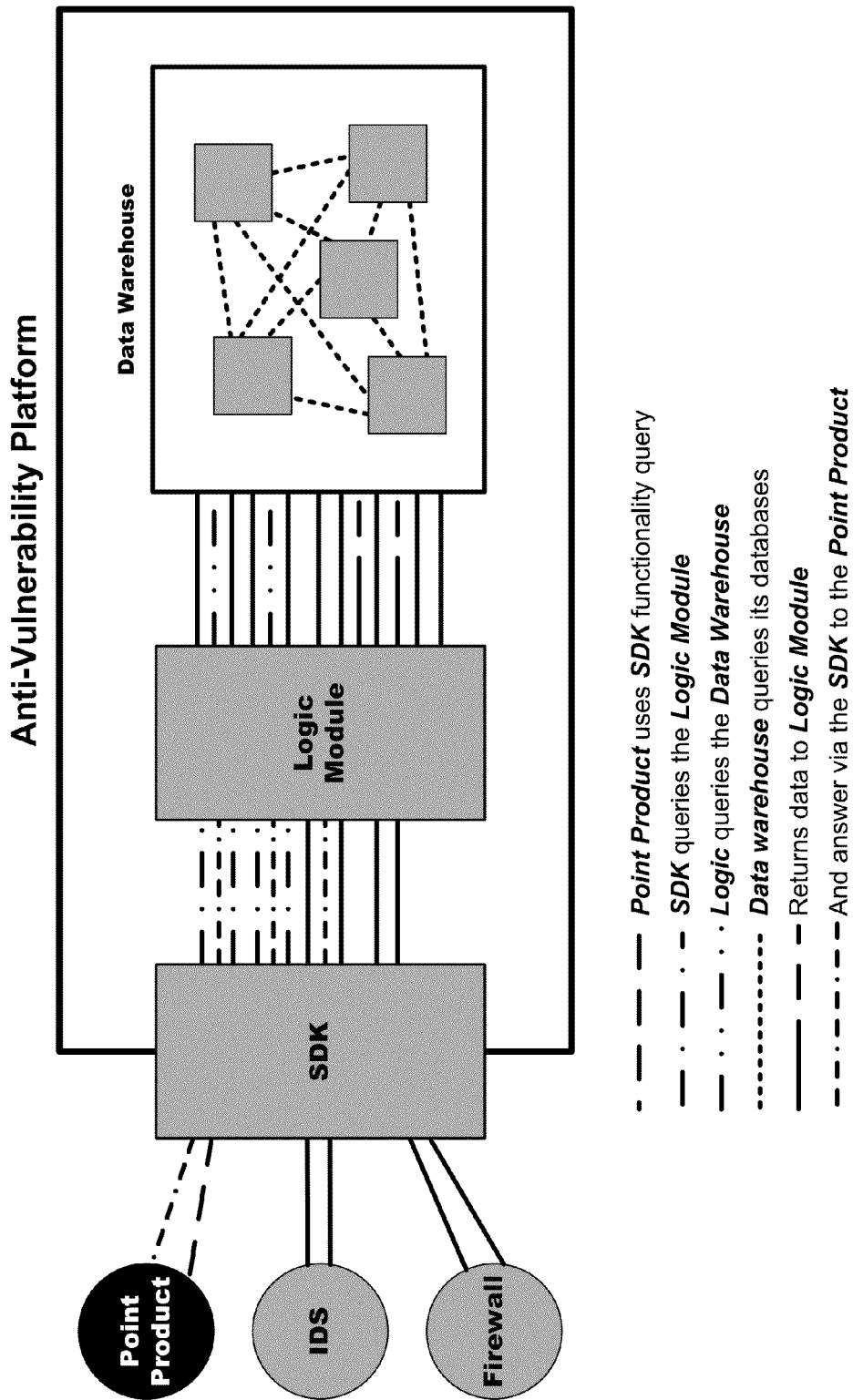
FIG. 12 illustrates an SDK function call flow, in accordance with one embodiment.

FIG. 12 illustrates an SDK function call flow, in accordance with one embodiment.

Hence, the SDK serves as the architect's tool belt or building blocks needed to quickly and transparently access the Anti-Vulnerability backend and seamlessly integrate the desired functionality into the product without changing or complicating the end user experience.

Furthermore, the SDK enables system architects to use the Anti-Vulnerability platform to integrate multiple security products and functionalities. Products may then share the same vulnerability data set, improve system automation and accuracy—increasing efficiencies and minimizing false positives and false negatives, and coordinate policy compliance and enforcement functionalities.

Anti-Vulnerability functions that are accessible via the SDK. The functions are presented in groups, as follows in Table 10.

TABLE 10

Session Management
Group Management Functions
Client Management Functions
Patch Management Functions
Polling Functions
User Management Functions
Miscellaneous Functions
Policy Compliance Functions
Session Management Functions Table 11 sets forth Session Management Functions

TABLE 11

OpenSession - Parameters: HOST name or IP address, LOGIN and PASSWORD for host
Returns: new SESSION
Description: This function opens a new session to the OnSite Server

TABLE 11-continued

CloseSession - Parameters: SESSION to close
    Returns: None
    Description: Closes a session that is no longer needed
IsSessionGood - Parameters: SESSION to test
    Returns: TRUE or FALSE
    Description: returns TRUE if the session is still valid FALSE if it is not
SUGetLastError - Parameters: None
    Returns: Error code of last error in the thread
    Description: Returns the error code of the last SDK error to occur in this thread
SUSetLastError - Parameters: ERROR code to set
    Returns: None
    Description: Sets the error code for the thread to be returned by SUGetLastError
GetSDKVersion - Parameters: None
    Returns: a WORD containing the version of the SDK
    Description: the MSB of the returned value is the major version number, the LSB is
    the minor version number
Ping - Parameters: SESSION to use, VALUE to ping with
    Returns: VALUE on success 0 on failure
    Description: attempts to pass VALUE to the OnSite Server, which should pass it back.

Table 12 sets forth Group Management Functions.

TABLE 12

CreateGroup - Parameters: Group NAME and Description
    Returns: GROUP that was just created or 0 on failure
    Description: This function creates a new group with the provided name and Description
GetGroups - Parameters: None
    Returns: A LIST of GROUPs.
    Description: This function Returns a list of all configured groups.
GetGroupsEx - Parameters: None
    Returns: A LIST of GROUPINFO structures
    Description: This function Returns a list of all configured groups' information
DeleteGroup - Parameters: GROUP to be deleted.
    Returns: Success or failure
    Description: This function permanently removes a group.
EditGroup - Parameters: GROUP to be edited, GROUPINFO to be applied
    Returns: Success or failure
    Description: This function changes a GROUP's information
GetGroupPolicyOSCategories - Parameters: GROUP to get information about
    Returns: A LIST of OPERATINGSYSTEMCATEGORYs that have group policies
    configured
    Description: This function retrieves a list of operating system categories that have
    group policies configured
GetGroupPolicyOSSubCategories - Parameters: GROUP to get information about,
    OPERATINGSYSTEMCATEGORY to get sub category information about
    Returns: A LIST of OPERATINGSYSTEMSUBCATEGORYs
    Description: This function retrieves a list of operating system sub-categories of
    OPERATINGSYSTEMCATEGORY that have policies for the GROUP
GetGroupPolicyInfo - Parameters: GROUPPOLICY to get information about,
    GROUPPOLICYINFO pointer to receive the information
    Returns: Success or Failure
    Description: This function fills the passed GROUPPOLICYINFO structure with the
    information for the GROUPPOLICY
GetGroupPolicyInfoByOSCat - Parameters: GROUP to get information about,
    OPERATINGSYSTEMCATEGORY to get the policy for, GROUPPOLICYINFO
    pointer to receive the information
    Returns: Success or failure
    Description: This function retrieves the information for a policy for the
    OPERATINGSYSTEMCATEGORY in the GROUP
GetGroupPolicyInfoByOSSubCat - Parameters: GROUP to get information about,
    OPERATINGSYSTEMSUBCATEGORY to get the policy for, GROUPPOLICYINFO
    pointer to receive the information
    Returns: Success or failure
    Description: This function retrieves the information for a policy for the
    OPERATINGSYSTEMSUBCATEGORY in the GROUP
DeleteGroupPolicy - Parameters: GROUPPOLICY to delete
    Returns: Success or failure
    Description: This function permanently deletes the GROUPPOLICY
EditGroupPolicy - Parameters: GROUPPOLICYINFO with new information
    Returns: Success or failure
    Description: This function updates the group policy (contained in
    GROUPPOLICYINFO) with the information in GROUPPOLICYINFO
AddGroupPolicy - Parameters: GROUP to add the policy to, GROUPPOLICYINFO containg
    the policy information
    Returns: Success or Failure
    Description: This function creates a new group policy and applies it to the GROUP

TABLE 12-continued

GetClientsInGroup - Parameters: GROUP to retrieve the clients from
    Returns: LIST of CLIENTs belonging to the group
    Description: This function retrieves a list of clients that are members of a specific
    group
GetClientsInGroupEx - Parameters: GROUP to retrieve the clients from
    Returns: LIST of CLIENTINFOs for clients belonging to the group
    Description: This function Returns a list of CLIENTINFO structures containing
    information for the clients that belong to this group
AddClientToGroup - Parameters: CLIENT to add to a group, GROUP to add the client to.
    Returns: Success or failure
    Description: This function adds a client to a group
RemoveClientFromGroup - Parameters: CLIENT to remove from group, GROUP to remove
    the client from
    Returns: Success or failure.
    Description: This function removes a client from a group.
MoveClientToGroup - Parameters: CLIENT to move, GROUP to move client to
    Returns: Success or Failure
    Description: This function moves CLIENT to GROUP
GetUngroupedClients - Parameters: None
    Returns: LIST of ungrouped clients
    Description: This function Returns a LIST of the clients that do not belong to any
    group
GetUngroupedClientsEx - Parameters: None
    Returns: LIST of CLIENTINFO structures
    Description: This function Returns a LIST of CLIENTINFO structures for the clients
    that do not belong to any group
GetGroupInfo - Parameters: GROUP to get information about, GROUPINFO pointer to
    receive the information
    Returns: Success or failure
    Description: This function retrieves the information for the GROUP Table 13 sets forth Client Management Functions.

TABLE 13

GetClientInstalledSoftware - Parameters: CLIENT to get information about
    Returns: LIST of SOFTWARE installed on the client
    Description: This function retrieves a list of the software that has been detected on the
    client
GetClientInstalledSoftwareEx - Parameters: CLIENT to get information about
    Returns: LIST of SOFTWAREINFO for software installed on the client
    Description: This function returns a LIST of SOFTWAREINFO structures describing
    the software detected on the client
GetClientInstalledPatches - Parameters: CLIENT to get information from.
    Returns: LIST of PATCHes corresponding to the installed patches on the client
    Description: This function retrieves a list of patches that were verified as installed on
    the last polling
GetClientInstalledPatchesEx - Parameters: CLIENT to get information from
    Returns: LIST of PATCHINFO structures corresponding to the installed patches on the
    client
    Description: This function retrieves a LIST of PATCHINFO structures for patches that
    were verified as installed on the last polling
GetClientPendingPatches - Parameters: CLIENT to get information from.
    Returns: LIST of PATCHes corresponding to the pending patches for the client
    Description: This function returns a list of patches that the client needs (according to
    group policy) as of the last polling.
GetClientPendingPatchesEx - Parameters: CLIENT to get information from
    Returns: A LIST of PATCHINFO structures corresponding to the pending patches for
    the client
    Description: This function returns a LIST of PATCHINFO structures for patches that
    the client needs (according to group policy) as of the last polling.
GetClientPendingServicePack - Parameters: CLIENT to get information from
    Returns: SERVICEPACK if a service pack is pending or 0 if not
    Description: This function returns a SERVICEPACK if there is a service pack pending
    for the client (according to group policy) as of the last polling. If there is no service
    pack pending it returns 0
GetClientPendingSoftware - Parameters: CLIENT to get information from
    Returns: LIST of SOFTWARE that is pending
    Description: This function returns a list of software that is pending for the client
    (according to group policy) as of the last polling
GetClientLogs - Parameters: CLIENT to get information from
    Returns: LIST of LOGs for the client.
    Description: This function returns a list of logs for a particular client.
GetClientLogsEx - Parameters: CLIENT to get information from
    Returns: LIST of LOGINFO structures
    Description: This function returns a list of LOGINFO structures containing log entries
    for a particular client.

TABLE 13-continued

DeleteClient - Parameters: CLIENT to delete.
    Returns: Success or failure.
    Description: This function removes all information pertaining to this client from the
    SysUpdate database.
GetClientOS - Parameters: CLIENT to get information from
    Returns: OPERATINGSYSTEM installed on client
    Description: This function returns the OPERATINGSYSTEM installed on the client
GetClientServicePack - Parameters: CLIENT to get information from
    Returns: SERVICEPACK installed on client or 0
    Description: This function returns the service pack installed on the client or 0 if the
    client does not have a service pack installed, or if service packs are not applicable to the
    client's platform
GetClientInfo - Parameters: CLIENT to get information from CLIENTINFO pointer to
    receive the information
    Returns: Success or failure
    Description: This function fills the passed CLIENTINFO structure with information
    pertaining to the passed CLIENT
GetClientFromIP - Parameters: IP address of client
    Returns: CLIENT that corresponds to the passed IP address
    Description: This function maps IP addresses to clients Table 14 sets forth Patch Management Functions.

TABLE 14

GetPatchInfo - Parameters: PATCH to get information about, PATCHINFO pointer to receive
    information
    Returns: Success or failure
    Description: This function fills the passed patch info structure with information about
    the passed patch
InstallPatchForClient - Parameters: CLIENT to install the patch on, PATCH to install
    Returns: Success or failure
    Description: This function deploys the patch to the client. Installation proceeds
    asynchronously
InstallPatchForGroup - Parameters: GROUP to install the patch on, PATCH to install
    Returns: Success or failure
    Description: This function deploys the patch to all clients in the group
InstallAllPendingForClient - Parameters: CLIENT to install patches on
    Returns: Success or failure
    Description: This function deploys all pending patches for a client to the client
InstallAllPendingForGroup - Parameters: GROUP to install patches on
    Returns: Success or failure
    Description: This function deploys all pending patches to all clients in a group
RejectPatchForClient - Parameters: CLIENT to reject patch for, PATCH to reject
    Returns: Success or failure
    Description: This function rejects a patch for a client. This patch will not be queued
    down or installed
RejectPatchForGroup - Parameters: GROUP to reject patch for, PATCH to reject
    Returns: Success or failure
    Description: This function rejects a patch for every client in a group. This patch will
    not be queued down or installed
RequeuePatchForClient - Parameters: CLIENT to requeue the patch for, PATCH to requeue
    Returns: Success or failure
    Description: This function requeues a previously rejected patch for a client
RequeuePatchForGroup - Parameters: GROUP to requeue the patch for, PATCH to requeue
    Returns: Success or failure
    Description: This function requeues a previously rejected patch for every client in a
    group
RemovePatchFromClient - Parameters: CLIENT to remove patch from, PATCH to remove
    Returns: Success or failure
    Description: This function will uninstall a patch from a client
RemovePatchFromGroup - Parameters: GROUP to remove patch from, PATCH to remove
    Returns: Success or failure
    Description: This function will uninstall a patch for every client in a group
InstallServicePackForClient - Parameters: CLIENT to install service pack on,
    SERVICEPACK to install on client
    Returns: Success or failure
    Description: This function will install a service pack on a client
InstallServicePackForGroup - Parameters: GROUP to install service pack on,
    SERVICEPACK to install
    Returns: Success or failure
    Description: This function will install a service pack on every client in a group
InstallSoftwareForClient - Parameters: CLIENT to install software update on, SOFTWARE to
    install
    Returns: Success or failure
    Description: This function will install a software update on a client TABLE 14-continued InstallSoftwareForGroup - Parameters: GROUP to install software update on, SOFTWARE to install
    Returns: Success or failure
    Description: This function will install a software update on every client in a group.
GetCveIDsFromPatch - Parameters: PATCH to get CveIDs from
    Returns: A LIST of CVEIDs
    Description: This function returns a list of CVEIDs the correspond to the PATCH Table 15 sets forth Polling Functions.

TABLE 15

PollClient - Parameters: CLIENT to poll
    Returns: Success or failure.
    Description: This function causes a client to be polled by the OnSite Server immediately.
PollGroup - Parameters: GROUP to poll
    Returns: Success or failure.
    Description: This function causes all the clients in a particular group to be polled immediately.
PollAll - Parameters: NONE
    Returns: Success or failure.
    Description: This function causes all clients to be polled immediately.

Table 16 sets forth User Management Functions.

TABLE 16

GetUsers - Parameters: None
    Returns: A LIST of USERs
    Description: This function returns a list of all users for the system
GetUserInfo - Parameters: USER to get information about, USERINFO pointer to receive the information
    Returns: Success or failure
    Description: This function populates the passed USERINFO structure with information about the passed USER
GetUserGroupPrivileges - Parameters: USER to get information about
    Returns: A LIST of USERGROUPPRIVILEGEs
    Description: This function returns a LIST of USERGROUPPRIVILEGES representing the privileges that a particular user has
GetUserGroupPrivilegesEx - Parameters: USER to get information about
    Returns: A LIST of USERGROUPPRIVILEGEINFO structures
    Description: This function returns a LIST of USERGROUPPRIVILEGEINFO structures representing the privileges that a particular user has
GetUserGroupPrivilegeInfo - Parameters: USERGROUPPRIVILEGE to get information about, USERGROUPPRIVILEGEINFO pointer to receive information
    Returns: Success or failure
    Description: This function populates the passed USERGROUPPRIVILEGEINFO structure with the details of the particular privilege
GetUserGroupPrivilegeInfoByGroup - Parameters: USER to get information about, GROUP to get information for, USERGROUPPRIVILEGEINFO pointer to populate
    Returns: Success or Failure
    Description: This function populates the passed USERGROUPPRIVILEGEINFO structure with the detailed information regarding the permissions that the passed user has on the passed group
AddUserGroupPrivilege - Parameters: USERGROUPPRIVILEGEINFO structure to add
    Returns: Success or failure
    Description: This function adds a USERGROUPPRIVILEGE
EditUserGroupPrivilege - Parameters: USERGROUPPRIVILEGEINFO with new values
    Returns: Success or failure
    Description: This function edits the USERGROUPPRIVILEGEINFO structure passed in, assign it the new values
DeleteUserGroupPrivilege - Parameters: USERGROUPPRIVILEGE to delete
    Returns: Success or failure
    Description: This function deletes the passed USERGROUPPRIVILEGE from the system
AddUser - Parameters: USERNAME, PASSWORD, and USERTYPE
    Returns: USER representing the user that was just created
    Description: This function creates a new user with the provided username, password, and type, and returns a USER representing the new user or 0 in the case of an error
DeleteUser - Parameters: USER to delete
    Returns: Success or failure
    Description: This function permanently deletes the USER from the system along with any privileges the user may have had
ChangeUserPassword - Parameters: USER to change password for, new PASSWORD
    Returns: Success or failure
    Description: This function changes the password for a user
ChangeUserRole - Parameters: USER to change role, ROLE to change to
    Returns: Success or failure
    Description: This Function changes a user's role

TABLE 16-continued

GetUserFromName - Parameters: USERNAME
    Returns: USER corresponding to the passed user name
    Description: This function provides a mapping from user names to USERs Table 17 sets forth Miscellaneous Functions.

TABLE 17

CreateList - Parameters: None
    Returns: A new, empty, LIST
    Description: This functions creates a new LIST that is initially empty
GetListItemEx - Parameters: LIST to retrieve item from, INDEX of item to retrieve, VOID
    pointer to receive item
    Returns: Success or failure
    Description: This function populates the memory pointed to by VOID with the
    contents of the LIST item at INDEX
GetListSize - Parameters: LIST to get the size of
    Returns: the size of the LIST
    Description: This function returns the number of elements currently in the list
AddItemToList - pointer to LIST to add the item to, LONG item to add
    Returns: None
    Description: This function adds an "item" (such as a GROUP or a CLIENT) to a LIST
AddClientInfoExToList - See AddItemToList
AddGroupInfoToList - See AddItemToList
AddPatchInfoExToList - See AddItemToList
AddSoftwareInfoToList - See AddItemToList
AddSoftwareCategoryInfoToList - See AddItemToList
AddUserGroupPrivilegeInfoExToList - See AddItemToList
RemoveItemFromList - Parameters: pointer to LIST to remove the item from, INDEX of item
    to remove
    Returns: None
    Description: This function removes the item at INDEX from the LIST
FreeList - LIST to deallocate
    Returns: None
    Description: This function deallocates the resources used by LIST
GetSoftwareInfo - Parameters: SOFTWARE to get information for, SOFTWAREINFO
    pointer to hold the information
    Returns: Success or failure
    Description: This function populates the SOFTWAREINFO structure pointed at with
    information regarding the SOFTWARE
GetLogInfo - Parameters: LOG to get information about, LOGINFO pointer to contain the
    information
    Returns: Success or failure
    Description: This function populates the LOGINFO structure pointed at with
    information regarding the LOG
GetSoftwareCategories - Parameters: None
    Returns: A LIST of SOFTWARECATEGORYs
    Description: This function returns a LIST of SOFTWARECATEGORYs
GetSoftwareCategoriesEx - Parameters: None
    Returns: A LIST of SOFTWARECATEGORYINFO structures
    Description: This function returns LIST of SOFTWARECATEGORYINFO structures
    for every software category known on the system
GetSoftwareCategoriesForOperatingSystemCategory - Parameters: an
    OPERATINGSYSTEMCATEGORY to get information for
    Returns: A LIST of SOFTWARECATEGORYs
    Description: This function returns a LIST of software categories for the passed
    operating system category.
GetSoftwareCategoriesForOperatingSystemCategoryEx - As above only, returning the
    appropriate "info" structures in the list
    GetSoftwareCategoryInfo - Parameters: SOFTWARECATEGORY to get information
    for, SOFTWARECATEGORYIFNO pointer to contain the information
    Returns: Success or failure Table 18 sets forth Policy Compliance Functions.

These functions are provided in a separate source tree (policy tree) for the Policy Compliance and Enforcement module. Function include: Password/system access policies, log configurations, audit settings, user/group privilege rights, general service settings, service permissions, registry values, registry permissions, file permissions. It can also perform deltas on and get information about: groups, users, services, and all the "Run" registry keys.

The function calls are being integrated into the live production tree and subject to change.

TABLE 18

GetPolicyItemInfo - As GetOperatingSystemInfo for POLICYITEM and POLICYITEMINFO
InstallPolicyItemForClient - As InstallPatchForClient for POLICYITEM TABLE 18-continued InstallPolicyItemForGroup - As InstallPatchForGroup for POLICYITEM
InstallAllPendingPolicyItemsForClient - As InstallAllPendingPatchesForClient for POLICYITEM
InstallAllPendingPolicyItemsForGroup - As InstallAllPendingPatchesForGroup for POLICYITEM
RemovePolicyItemFromClient - As RemovePatchForClient for POLICYITEM
RemovePolicyItemFromGroup - As RemovePatchFromGroup for POLICYITEM All publications, prior applications, and other documents cited herein are hereby incorporated by reference in their entirety as if each had been individually incorporated by reference and fully set forth.

While the invention has been illustrated and described in detail in the drawings and foregoing description, the same is to be considered as illustrative and not restrictive in character, it being understood that only the preferred embodiments have been shown and described and that all changes and modifications that would occur to one skilled in the relevant art are desired to be protected.

What is claimed is:

1. A computer program product embodied on a non-transitory computer readable medium, comprising:
   code for receiving actual vulnerability information from at least one first data storage that is generated utilizing potential vulnerability information from at least one second data storage that is used to identify a plurality of potential vulnerabilities, by including:
      at least one first potential vulnerability, and
      at least one second potential vulnerability;
   said actual vulnerability information generated utilizing the potential vulnerability information, in response to code execution by at least one processor, by:
      identifying at least one configuration associated with a plurality of devices including a first device, a second device, and a third device, and
      determining that the plurality of devices is actually vulnerable to at least one actual vulnerability based on the identified at least one configuration, utilizing the potential vulnerability information that is used to identify the plurality of potential vulnerabilities;
   code for identifying an occurrence in connection with at least one of the plurality of devices;
   code for determining that the at least one actual vulnerability of the at least one of the plurality of devices is susceptible to being taken advantage of by the occurrence identified in connection with the at least one of the plurality of devices, utilizing the actual vulnerability information; and
   code for providing a user with one or more options to selectively utilize different occurrence mitigation actions of diverse occurrence mitigation types, including a firewall-based occurrence mitigation type and an intrusion prevention system-based occurrence mitigation type, across the plurality of devices for occurrence mitigation by preventing advantage being taken of actual vulnerabilities utilizing the different occurrence mitigation actions of the diverse occurrence mitigation types across the plurality of devices.

2. The computer program product of claim 1, wherein the computer program product is operable for providing at least two options via a user interface including a firewall-type option for preventing at least one occurrence packet, and an intrusion prevention-type option for preventing a connection request; the computer program product is further operable such that, in response to user input received prior to receipt of the at least one occurrence packet, the firewall-type option is capable of being applied to the plurality of devices by sending a first signal over at least one network to at least one first component with firewall-type functionality such that the at least one occurrence packet is prevented across the plurality of devices; and the computer program product is further operable such that, in response to additional user input after the receipt of the at least one occurrence packet in connection with a particular single device of the plurality of devices, the intrusion prevention-type option is capable of being applied to the particular single device by sending a second signal over the at least one network to at least one second component with intrusion prevention-type functionality such that the connection request is prevented at the particular single device.

3. The computer program product of claim 1, wherein the computer program product is operable such that the provided one or more options includes at least two options including a firewall-type option, and an intrusion prevention-type option for preventing a connection request; the computer program product is further operable such that, in response to user input prior to receipt of the at least one occurrence packet, the intrusion prevention-type option is capable of being applied to the plurality of devices for preventing the connection request across the plurality of devices after the receipt of the at least one occurrence packet; and the computer program product is further operable such that, in response to user input after the receipt of the at least one occurrence packet in connection with a particular single device of the plurality of devices, the firewall-type option is capable of being applied to the particular single device.

4. The computer program product of claim 1, wherein the computer program product is operable such that the at least one actual vulnerability is determined as a function of at least one of an operating system or an application identified in connection with the plurality of devices based on the identified at least one configuration, so that, in order to avoid false positives, only relevant vulnerabilities prompt user selection among the different occurrence mitigation actions of the diverse occurrence mitigation types in connection therewith.

5. The computer program product of claim 1, wherein the computer program product is operable such that which of the different occurrence mitigation actions for which the one or more options are provided, is based on one or more of the actual vulnerabilities to which the plurality of devices is actually vulnerable so that only relevant occurrence mitigation actions are available for selection by the user.

6. The computer program product of claim 1, wherein the computer program product is operable such that the at least one actual vulnerability is determined as a function of at least one of an operating system or an application identified in connection with the plurality of devices and at least one some of the different occurrence mitigation actions are specific to the at least one actual vulnerability.

7. The computer program product of claim 1, wherein the computer program product is operable such that different user input is capable of being received prior to the occurrence for different devices, for allowing completion of the different occurrence mitigation actions, in a manner that the different user input is capable of resulting in: only a first occurrence mitigation action of the firewall-based occurrence mitigation type being user-selectively completed at the first device in response to the occurrence, only a second occurrence mitigation action of the intrusion prevention system-based occurrence mitigation type being user-selectively completed at the second device in response to the occurrence, and both the first occurrence mitigation action and the second occurrence mitigation action being user-selectively completed at the third device in response to the occurrence.

8. The computer program product of claim 7, wherein the computer program product is operable such that additional user input is capable of being received after a reporting of the occurrence, for causing completion of the different occurrence mitigation actions, in a manner that the additional user input is capable of resulting in: the first occurrence mitigation action of the firewall-based occurrence mitigation type being supplemented by the second occurrence mitigation action of the intrusion prevention system-based occurrence mitigation type at the first device.

9. The computer program product of claim 7, wherein the computer program product is operable such that additional user input is capable of being received after a reporting of the occurrence, for prompting a rollback of one or more of the different occurrence mitigation actions, in a manner that the additional user input is capable of resulting in: the second occurrence mitigation action of the intrusion prevention system-based occurrence mitigation type being rolled back at the third device.

10. The computer program product of claim 1, wherein the computer program product is operable such that the one or more options are provided to the user so that the user is capable of selectively utilizing both of the different occurrence mitigation actions of the diverse occurrence mitigation types in connection with the at least one actual vulnerability which includes a single actual vulnerability, such that both of the different occurrence mitigation actions are associated with the single actual vulnerability.

11. The computer program product of claim 1, and further comprising: code for: determining the occurrence to have a first severity if it is determined that the at least one actual vulnerability of the at least one of the plurality of devices is susceptible to being taken advantage of by the occurrence, and further determining the occurrence to have a second severity if it determined that the at least one actual vulnerability of the at least one of the plurality of devices is not susceptible to being taken advantage of by the occurrence; and code for reporting the occurrence differently based on whether the occurrence is determined to have the first severity or the second severity.

12. The computer program product of claim 1, wherein the computer program product is operable such that the different occurrence mitigation actions of the diverse occurrence mitigation types include: a first occurrence mitigation action of the firewall-based occurrence mitigation type including at least one of setting a configuration option, setting of a policy, or an installation of a patch; and a second occurrence mitigation action of the intrusion prevention system-based occurrence mitigation type including at least one of setting the configuration option, the setting of the policy, or the installation of the patch that is different than that included in connection with the first occurrence mitigation action.

13. The computer program product of claim 1, wherein the computer program product is operable such that the one or more options include multiple options that are provided by being displayed via an intrusion prevention system interface of an intrusion prevention system that is supported by a single client agent that supports at least one aspect of the identifying the occurrence, at least one aspect of automatically completing a first one of the different occurrence mitigation actions of the firewall-based occurrence mitigation type in response to a selection of a first one of the multiple options, and at least one aspect of automatically completing a second one of the different occurrence mitigation actions of the intrusion prevention system-based occurrence mitigation type in response to a selection of a second one of the multiple options.

14. The computer program product of claim 1, and further comprising: code for displaying the one or more options, utilizing at least one user interface; code for receiving a first user input selecting a first one of the options, utilizing the at least one user interface; code for, based on the first user input, automatically applying a first one of the different occurrence mitigation actions of the firewall-based occurrence mitigation type; code for receiving a second user input selecting a second one of the options, utilizing the at least one user interface; and code for, based on the second user input, automatically applying a second one of the different occurrence mitigation actions of the intrusion prevention system-based occurrence mitigation type.

15. The computer program product of claim 14, wherein the computer program product is operable such that the automatic application of the first one of the different occurrence mitigation actions of the firewall-based occurrence mitigation type includes sending a first signal to at least one component with firewall functionality; and the automatic application of the second one of the different occurrence mitigation actions of the intrusion prevention system-based occurrence mitigation type includes sending a second signal to at least one component with intrusion prevention system functionality.

16. The computer program product of claim 1, wherein the computer program product is operable such that the different occurrence mitigation actions of the diverse occurrence mitigation types are capable of being automatically applied to different occurrences with different severities in real-time in response the identification of the different occurrences based on a user selection of the one or options before the identification of the different occurrences.

17. The computer program product of claim 1, and further comprising code for, based on user input, automatically blocking the occurrence, to prevent an attack from taking advantage of the at least one actual vulnerability while there is no installation of a patch that removes the at least one actual vulnerability.

18. The computer program product of claim 1, wherein the code for identifying the occurrence is capable of: identifying at least one first occurrence packet of a first occurrence directed to the first device, and identifying at least one second occurrence packet of a second occurrence directed to the second device; the code for determining that the at least one actual vulnerability of the at least one of the plurality of devices is susceptible is capable of: identifying at least one aspect of the at least one first occurrence packet and utilizing the at least one aspect of the at least one first occurrence packet to determine whether a first actual vulnerability of the first device identified by the actual vulnerability information is capable of being taken advantage of by the at least one first occurrence packet, and identifying at least one aspect of the at least one second occurrence packet and utilizing the at least one aspect of the at least one second occurrence packet to determine whether a second actual vulnerability of the second device identified by the actual vulnerability information is capable of being taken advantage of by the at least one second occurrence packet; and the code for providing the user with the one or more options includes code for displaying the one or more options via a graphical user interface and receiving user input via the graphical user interface; wherein the computer program product is operable such that, based on the user input, a first occurrence mitigation action of the different occurrence mitigation actions of the firewall-based occurrence mitigation type is completed by sending a first signal over at least one network to a first component with a firewall type functionality and preventing the first occurrence including the at least one first occurrence packet from taking advantage of the first actual vulnerability in connection with the first device; and wherein the computer program product is further operable such that a second occurrence mitigation action of the different occurrence mitigation actions of the intrusion prevention system-based occurrence mitigation type is completed by sending a second signal to a second component with an intrusion prevention system type functionality and preventing the second occurrence including the at least one second occurrence packet, in automatic response thereto, from taking advantage of the second actual vulnerability in connection with the second device.

19. The computer program product of claim 18, wherein the computer program product is operable such that at least one of:
  said at least one first data storage includes at least one first database;
  said at least one second data storage includes at least one second database;
  said potential vulnerability information is received from the at least one second data storage by at least one of:
  receiving at least one update therefrom; pulling at least one update therefrom, communicating therewith, or synchronizing therewith;
  said actual vulnerability information is generated via a vulnerability scan operation;
  said first device, said second device, and said third device are part of the same group;
  said at least one configuration includes at least one of configuration data, configuration information, or a configuration status;
  said at least one configuration includes at least one of a configuration option, a policy setting, or a patch;
  said at least one configuration is capable of being utilized for identifying at least one of an operating system or an application;
  said at least one configuration is identified utilizing information regarding at least one of an operating system or an application;
  said at least one configuration is identified via user input in connection with at least one setting;
  said user is provided with the one or more options via presentation utilizing one or more user interface elements;
  said occurrence mitigation by preventing advantage being taken includes at least one of removing the at least one actual vulnerability, or reducing an effect of any occurrence that is capable of taking advantage of the at least one actual vulnerability;
  said firewall-based occurrence mitigation type includes at least one of: a type that mitigates the occurrence utilizing firewall functionality, or a type that mitigates the occurrence utilizing a firewall;
  said intrusion prevention system-based occurrence mitigation type includes at least one of: a type that mitigates the occurrence utilizing intrusion prevention system functionality, or a type that mitigates the occurrence utilizing an intrusion prevention system;
  said user is provided with the one or more options to selectively utilize the different occurrence mitigation actions of the diverse occurrence mitigation types across the plurality of devices to mitigate the occurrence by preventing the occurrence from taking advantage of the at least one actual vulnerability after the occurrence;
  said preventing advantage being taken of the actual vulnerabilities utilizing the different occurrence mitigation actions of the diverse occurrence mitigation types across the plurality of devices, includes utilizing a first one of the different occurrence mitigation actions on one of the plurality of devices and utilizing a second one of the different occurrence mitigation actions on another one of the plurality of devices;
  said preventing advantage being taken of the actual vulnerabilities utilizing the different occurrence mitigation actions of the diverse occurrence mitigation types across the plurality of devices, includes utilizing a first one of the different occurrence mitigation actions and a second one of the different occurrence mitigation actions on each of the plurality of devices;
  said preventing advantage being taken of the actual vulnerabilities utilizing the different occurrence mitigation actions of the diverse occurrence mitigation types across the plurality of devices, includes completing a selected at least one of a first one of the different occurrence mitigation actions or a second one of the different occurrence mitigation actions to address the at least one actual vulnerability in connection with at least one of the plurality of devices;
  said preventing advantage being taken of the actual vulnerabilities utilizing the different occurrence mitigation actions of the diverse occurrence mitigation types across the plurality of devices, includes utilizing a first one of the different occurrence mitigation actions for a first actual vulnerability and utilizing a second one of the different occurrence mitigation actions for a second actual vulnerability;
  said at least one actual vulnerability includes an operating system;
  said actual vulnerabilities include the at least one actual vulnerability;
  said preventing advantage being taken of the actual vulnerabilities utilizing the different occurrence mitigation actions of the diverse occurrence mitigation types across the plurality of devices, includes utilizing a first one of the different occurrence mitigation actions for a first aspect of the at least one actual vulnerability which includes an operating system and utilizing a second one of the different occurrence mitigation actions for a second aspect of the operating system;
  one or more of said one or more options are capable of being selected after the occurrence to selectively utilize the different occurrence mitigation actions of the diverse occurrence mitigation types;
  one or more of said one or more options are capable of being selected before the occurrence to selectively utilize the different occurrence mitigation actions of the diverse occurrence mitigation types;
  said different occurrence mitigation actions include different remediation actions;
  said different occurrence mitigation actions of the diverse occurrence mitigation types utilized at the plurality of devices include the same set of said different occurrence mitigation actions;

said occurrence includes at least one of a request, traffic, at least one packet, or a potential attack;
further comprising the code for execution by the at least one processor;
said at least one aspect of the at least one first occurrence packet involves at least one of a
payload thereof or an IP address;
said at least one aspect of the at least one first occurrence packet is utilized to determine whether the first actual vulnerability of the first device identified by the actual vulnerability information is capable of being taken advantage of by the at least one first occurrence packet, by utilizing the at least one aspect in connection with at least one of a cross-referencing operation or a look-up operation;
said user input includes separate user input for selecting the first occurrence mitigation action and the second occurrence mitigation action;
said first signal and thee second signal include at least one of response signals, or signals sent in response to a query signal;
said first component with the firewall type functionality includes at least one of a firewall, a gateway with the firewall type functionality, a router with the firewall type functionality, a sensor with the firewall type functionality, or a multiple-security product system with the firewall type functionality;
said second component with the intrusion prevention system type functionality includes at least one of an intrusion prevention system, an intrusion detection system with the intrusion prevention system type functionality, a gateway with the intrusion prevention system type functionality, a router with the intrusion prevention system type functionality, a sensor with the intrusion prevention system type functionality, or a multiple-security product system with the intrusion prevention system type functionality;
said preventing includes at least one of rejecting a request, disallowing an attempt, dropping at least one packet, blocking a potential attack, redirecting a request, setting a policy, affecting a service, changing a configuration option, or installing a patch; or
said automatic response includes a real-time response.

20. The computer program product of claim 1, wherein the computer program product is operable such that each of:
said at least one first data storage includes at least one first database;
said at least one second data storage includes at least one second database;
said potential vulnerability information is received from the at least one second data storage by at least one of: receiving at least one update therefrom; pulling at least one update therefrom, communicating therewith, or synchronizing therewith;
said actual vulnerability information is generated via a vulnerability scan operation;
said actual vulnerability information identifies at least one actual vulnerability;
said actual vulnerability information includes at least one of a vulnerability identifier or information associated with one or more of the actual vulnerabilities;
said first device, said second device, and said third device are part of the same group;
said at least one configuration includes at least one of configuration data, configuration information, or a configuration status;
said at least one configuration includes at least one of a configuration option, a policy setting, or a patch;
said at least one configuration is capable of being utilized for identifying at least one of an operating system or an application;
said at least one configuration is identified utilizing information regarding at least one of an operating system or an application;
said at least one configuration is identified via user input in connection with at least one setting;
said user is provided with the one or more options via presentation utilizing one or more user interface elements;
said occurrence mitigation includes at least one of removing the at least one actual vulnerability, or reducing an effect of any occurrence that is capable of taking advantage of the at least one actual vulnerability;
said firewall-based occurrence mitigation type includes at least one of: a type that mitigates the occurrence utilizing firewall functionality, or a type that mitigates the occurrence utilizing a firewall;
said intrusion prevention system-based occurrence mitigation type includes at least one of: a type that mitigates the occurrence utilizing intrusion prevention system functionality, or a type that mitigates the occurrence utilizing an intrusion prevention system;
said user is provided with the one or more options to selectively utilize the different occurrence mitigation actions of the diverse occurrence mitigation types across the plurality of devices to mitigate the occurrence by preventing the occurrence from taking advantage of the at least one actual vulnerability after the occurrence;
said preventing advantage being taken of the actual vulnerabilities utilizing the different occurrence mitigation actions of the diverse occurrence mitigation types across the plurality of devices, includes utilizing a first one of the different occurrence mitigation actions on one of the plurality of devices and utilizing a second one of the different occurrence mitigation actions on another one of the plurality of devices;
said preventing advantage being taken of the actual vulnerabilities utilizing the different occurrence mitigation actions of the diverse occurrence mitigation types across the plurality of devices, includes utilizing a first one of the different occurrence mitigation actions and a second one of the different occurrence mitigation actions on each of the plurality of devices;
said preventing advantage being taken of the actual vulnerabilities utilizing the different occurrence mitigation actions of the diverse occurrence mitigation types across the plurality of devices, includes completing a selected at least one of a first one of the different occurrence mitigation actions or a second one of the different occurrence mitigation actions to address the at least one actual vulnerability in connection with at least one of the plurality of devices;
said preventing advantage being taken of the actual vulnerabilities utilizing the different occurrence mitigation actions of the diverse occurrence mitigation types across the plurality of devices, includes utilizing a first one of the different occurrence mitigation actions for a first actual vulnerability and utilizing a second one of the different occurrence mitigation actions for a second actual vulnerability;
said at least one actual vulnerability is an operating system;
said preventing advantage being taken of the actual vulnerabilities utilizing the different occurrence mitigation actions of the diverse occurrence mitigation types across the plurality of devices, includes utilizing a first one of the different occurrence mitigation actions for a first aspect of the at least one actual vulnerability which is an operating system and utilizing a second one of the different occurrence mitigation actions for a second aspect of the operating system;

one or more of said one or more options are capable of being selected after the occurrence to selectively utilize the different occurrence mitigation actions of the diverse occurrence mitigation types;

one or more of said one or more options are capable of being selected before the occurrence to selectively utilize the different occurrence mitigation actions of the diverse occurrence mitigation types;

said different occurrence mitigation actions include different remediation actions;

said different occurrence mitigation actions of the diverse occurrence mitigation types utilized at the plurality of devices include the same set of said different occurrence mitigation actions;

said occurrence includes at least one of a request, traffic, at least one packet, or a potential attack;

said at least one actual vulnerability includes at least one of the potential vulnerabilities to which the plurality of devices is determined to be actually vulnerable based on the identified at least one configuration;

said at least one configuration includes at least one of: service pack information, one or more elements contained in files including at least one of an *.ini or *.conf file, registry information, identification of an operating system, identification of a software version, or identification of software;

said determining that the plurality of devices is actually vulnerable to the at least one actual vulnerability includes at least one of: matching the identified at least one configuration with a guideline associated with at least one update, or cross-referencing an identifier with the identified at least one configuration;

said computer program product is embodied on a single non-transitory computer readable medium;

one or more of said different occurrence mitigation actions, after a user selection, is automatically applied at a later time;

one or more of said different occurrence mitigation actions puts a policy in place for being utilized at a later time;

one or more of said different occurrence mitigation actions, after an automatic application thereof, is utilized at a later time for the occurrence mitigation;

one of said different occurrence mitigation actions of the intrusion prevention system-based occurrence mitigation type utilizes an intrusion prevention system to deploy a patch;

one of said different occurrence mitigation actions of the firewall-based occurrence mitigation type utilizes a firewall to deploy a patch utilizing an update component; and wherein the computer program product is further operable for use with at least one NOC server, a data warehouse, and an SDK for allowing access to information associated with at least one vulnerability and at least one remediation, and wherein the computer program product is operable for determining which devices have vulnerabilities by directly querying a firmware or operating system of the devices.

* * * * *